(12) United States Patent
Segall et al.

(10) Patent No.: US 12,347,338 B2
(45) Date of Patent: *Jul. 1, 2025

(54) PROSTHETIC INTERNAL ORGAN MODULE

(71) Applicant: AMERICAN 3B SCIENTIFIC, L.P., Tucker, GA (US)

(72) Inventors: Stuart C. Segall, La Jolla, CA (US); Kit Lavell, San Diego, CA (US); Aislinn Brody, San Diego, CA (US)

( * ) Notice: Subject to any disclaimer, the term of this patent is extended or adjusted under 35 U.S.C. 154(b) by 827 days.

This patent is subject to a terminal disclaimer.

(21) Appl. No.: 17/489,151

(22) Filed: Sep. 29, 2021

(65) Prior Publication Data

US 2022/0020293 A1 Jan. 20, 2022

Related U.S. Application Data

(60) Continuation-in-part of application No. 16/449,279, filed on Jun. 21, 2019, now Pat. No. 11,151,902, which is a continuation of application No. 15/919,024, filed on Mar. 12, 2018, now Pat. No. 10,360,817, which is a continuation-in-part of application No. 14/943,099, filed on Nov. 17, 2015, now Pat. No. 9,916,774, which is a division of application No. 14/494,490, filed on Sep. 23, 2014, now Pat. No. 9,336,693, which is a division of application No. 12/803,609, filed on Jun. 30, 2010, now Pat. No. 8,840,403.

(51) Int. Cl.
*G09B 23/30* (2006.01)
*G09B 23/28* (2006.01)
*G09B 23/32* (2006.01)

(52) U.S. Cl.
CPC ............ *G09B 23/303* (2013.01); *G09B 23/28* (2013.01); *G09B 23/30* (2013.01); *G09B 23/32* (2013.01)

(58) Field of Classification Search
CPC ...... G09B 23/303; G09B 23/28; G09B 23/30; G09B 23/32
USPC .......................................................... 434/268
See application file for complete search history.

(56) References Cited

U.S. PATENT DOCUMENTS

| | | |
|---|---|---|
| 2,213,270 A | 9/1940 | Chase |
| 2,689,415 A | 9/1954 | Haver |
| 2,752,697 A | 7/1956 | Lawall |
| 2,995,832 A | 8/1961 | Alderson |
| 3,027,655 A | 4/1962 | Alderson |
| 3,562,820 A | 2/1971 | Braun |
| 3,852,893 A | 12/1974 | Smrcka |
| 4,209,919 A | 7/1980 | Krikae et al. |

(Continued)

*Primary Examiner* — Peter S Vasat
*Assistant Examiner* — Stephen Alvesteffer
(74) *Attorney, Agent, or Firm* — Enrique Monteagudo, Esq.

(57) ABSTRACT

A wearable device for simulating wounds and injuries received during a trauma event includes a raiment and vest for covering the torso of a person. The raiment has an outer surface with a color and a texture comparable to human skin. Mounted on the outer surface is at least one wound simulator formed with an orifice that is in fluid communication with a fluid reservoir. Thus, the person can selectively expel a blood-like fluid from the reservoir, and through the wound simulator orifice, to simulate a trauma event. The vest includes an artificial rib cage and prosthetic internal organs juxtaposed with at least one wound simulator to simulate internal effects of a trauma event.

16 Claims, 13 Drawing Sheets

(56) References Cited

U.S. PATENT DOCUMENTS

| | | |
|---|---|---|
| 4,221,975 A | 9/1980 | Ledniczki et al. |
| 4,288,222 A | 9/1981 | Kling |
| 4,331,426 A | 5/1982 | Sweeney |
| 4,408,597 A | 10/1983 | Tenny, Jr. |
| 4,439,162 A | 3/1984 | Blaine |
| 4,531,919 A | 7/1985 | Ware |
| 4,773,865 A | 9/1988 | Baldwin |
| 4,878,890 A | 11/1989 | Bilweis |
| 4,917,372 A | 4/1990 | Zeitlin |
| 5,104,328 A | 4/1992 | Lounsbury |
| 5,156,777 A | 10/1992 | Kaye |
| 5,305,181 A | 4/1994 | Schultz |
| 5,397,237 A | 3/1995 | Dhont et al. |
| 5,411,437 A | 5/1995 | Weber et al. |
| 5,634,797 A | 6/1997 | Montgomery |
| 5,823,787 A | 10/1998 | Gonzalez et al. |
| 5,990,625 A | 11/1999 | Meissner et al. |
| 5,995,077 A | 11/1999 | Wilcox et al. |
| 6,022,743 A | 2/2000 | Naughton et al. |
| 6,057,540 A | 5/2000 | Gordon et al. |
| 6,234,804 B1 | 5/2001 | Yong |
| 6,471,723 B1 | 10/2002 | Ashforth et al. |
| 6,544,041 B1 | 4/2003 | Damadian |
| 6,780,016 B1 | 8/2004 | Toly |
| 6,942,692 B2 | 9/2005 | Landau et al. |
| 6,984,208 B2 | 1/2006 | Zheng |
| 7,021,940 B2 | 4/2006 | Morris et al. |
| 7,037,343 B2 | 5/2006 | Imran |
| 7,201,772 B2 | 4/2007 | Schwammenthal et al. |
| 7,326,237 B2 | 2/2008 | DePalma et al. |
| 7,665,995 B2 | 2/2010 | Toly |
| 7,810,504 B2 | 10/2010 | Guzman |
| 7,850,456 B2 | 12/2010 | Chosack et al. |
| 7,857,626 B2 | 12/2010 | Toly |
| 7,887,330 B2 | 2/2011 | King |
| 7,963,770 B2 | 6/2011 | Kukora et al. |
| 7,967,679 B2 | 6/2011 | Ombrellaro et al. |
| 8,012,189 B1 | 9/2011 | Webb et al. |
| 8,070,743 B2 | 12/2011 | Kagen et al. |
| 8,162,668 B2 | 4/2012 | Toly |
| 8,262,668 B2 | 9/2012 | Biegun |
| 8,342,852 B2 | 1/2013 | King |
| 8,382,485 B2 | 2/2013 | Bardsley et al. |
| 8,491,309 B2 | 7/2013 | Parry et al. |
| 8,770,985 B2 | 7/2014 | Adams |
| 8,840,403 B2 | 9/2014 | Segall |
| 9,017,080 B1 | 4/2015 | Placik |
| 9,336,693 B2 | 5/2016 | Segall |
| 10,847,058 B2 | 11/2020 | Segall |
| 2004/0126746 A1* | 7/2004 | Toly ............... G09B 23/28 434/262 |
| 2005/0214727 A1* | 9/2005 | Stoianovici ........ G09B 23/28 434/262 |
| 2007/0218438 A1 | 9/2007 | Sanders et al. |
| 2007/0243512 A1 | 10/2007 | King |
| 2007/0292829 A1 | 12/2007 | King et al. |
| 2008/0038702 A1 | 4/2008 | Choquet |
| 2008/0167398 A1 | 7/2008 | Patil et al. |
| 2008/0227073 A1 | 9/2008 | Bardsley et al. |
| 2008/0274769 A1 | 11/2008 | Linden |
| 2009/0051544 A1 | 2/2009 | Niknejad |
| 2009/0068627 A1 | 3/2009 | Toly |
| 2009/0246747 A1 | 10/2009 | Buckman, Jr. |
| 2009/0263775 A1 | 10/2009 | Ullrich |
| 2009/0291421 A1 | 11/2009 | Duprez et al. |
| 2009/0292161 A1 | 11/2009 | Parker |
| 2009/0298034 A1* | 12/2009 | Parry ............... G09B 23/30 434/274 |
| 2010/0062407 A1 | 3/2010 | Lecat |
| 2010/0167248 A1 | 7/2010 | Ryan |
| 2010/0167253 A1 | 7/2010 | Ryan et al. |
| 2010/0167254 A1 | 7/2010 | Nguyen |
| 2010/0209899 A1 | 8/2010 | Park et al. |
| 2011/0008760 A1 | 1/2011 | Bevan et al. |
| 2011/0060555 A1 | 3/2011 | Koehler et al. |
| 2012/0003621 A1 | 1/2012 | Segall |
| 2012/0015339 A1 | 1/2012 | Hendrickson et al. |
| 2012/0148994 A1 | 6/2012 | Hori et al. |
| 2012/0202180 A1 | 8/2012 | Stock |
| 2012/0270197 A1 | 10/2012 | Brost |
| 2013/0059279 A1 | 3/2013 | Reid-Searl |
| 2013/0078604 A1 | 3/2013 | King |
| 2013/0123940 A1 | 5/2013 | Hurely et al. |
| 2014/0017650 A1 | 1/2014 | Romero |
| 2014/0082814 A1 | 3/2014 | Rober et al. |
| 2014/0154656 A1 | 6/2014 | Segall |
| 2017/0011655 A1 | 1/2017 | Sakezles |
| 2020/0013314 A1 | 1/2020 | Hare |
| 2021/0150937 A1 | 5/2021 | White |

\* cited by examiner

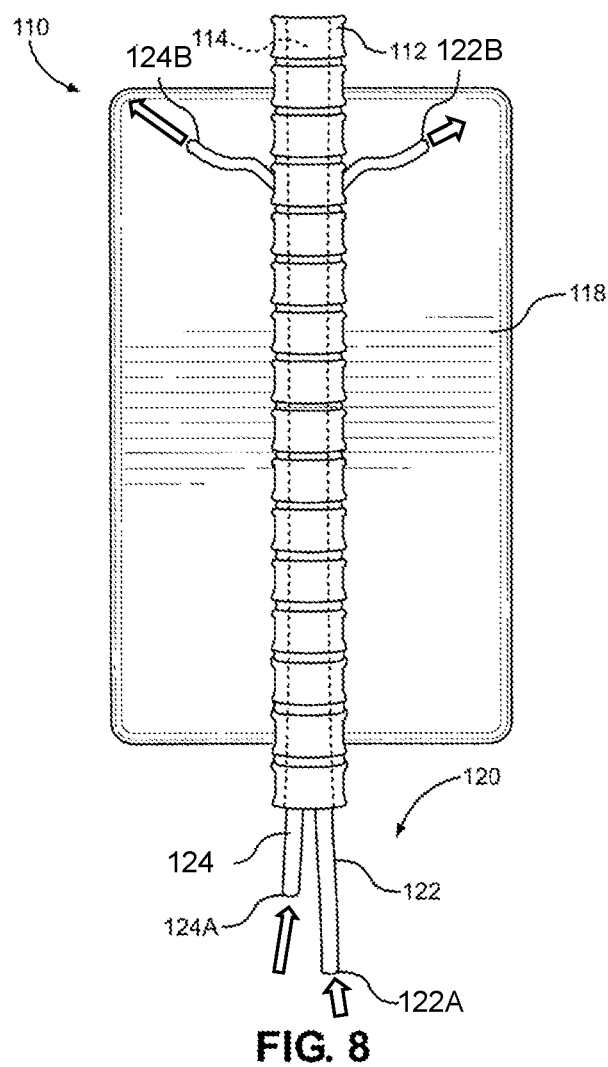
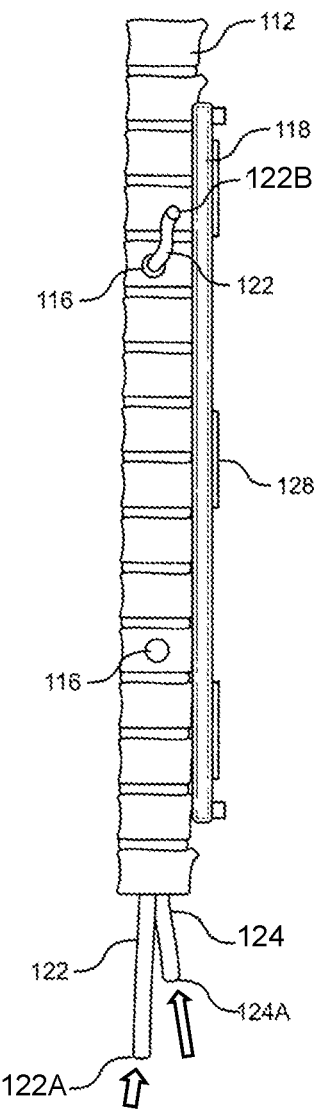
FIG. 8
FIG. 9

PROSTHETIC INTERNAL ORGAN MODULE

CROSS-REFERENCE TO RELATED APPLICATIONS

This application is a continuation in part of currently pending U.S. patent application Ser. No. 16/449,279, filed Jun. 21, 2019 and entitled "Wearable Partial Task Surgical Simulator"; which is a continuation of U.S. patent application Ser. No. 15/919,024, filed Mar. 12, 2018 and entitled "Wearable Partial Task Surgical Simulator" and issued as U.S. Pat. No. 10,360,817 on Jul. 23, 2019; which is a continuation-in-part of U.S. patent application Ser. No. 14/943,099, filed Nov. 17, 2015, entitled "Wearable Partial Task Simulator" and issued as U.S. Pat. No. 9,916,774 on Mar. 13, 2018; which is a divisional of U.S. patent application Ser. No. 14/494,490, filed on Sep. 23, 2014, entitled "Wearable Partial Task Simulator", and issued as U.S. Pat. No. 9,336,693 on May 5, 2016; which is a divisional of U.S. patent application Ser. No. 12/803,609, filed on Jun. 30, 2010, entitled "Wearable Partial Task Simulator", and issued as U.S. Pat. No. 8,840,403 on Sep. 23, 2014, the contents of which are all incorporated herein by reference in their entirety.

BACKGROUND OF THE INVENTION

Technical Field

The present invention pertains generally to devices and methods for use in simulating the injurious effects of a traumatic event on a person. More particularly, the present invention pertains to devices and methods for simulating the wounds and injuries that a person may receive during such an event. The present invention is particularly, but not exclusively, useful as a training aid for providing realistic-looking medical effects to first responders, in a dynamic presentation, when practicing first aid on a person who has experienced trauma.

Related Art

As is well known, and widely accepted, partial task simulators and training aids can be very effective for teaching individuals how to perform a wide variety of different tasks. More specifically, they can be extremely helpful for teaching an individual how to perform certain medical procedures. The present invention is particularly, but not exclusively, useful as a training aid for providing realistic-looking medical effects to first responders, in a dynamic presentation, when practicing first aid on a person who has experienced trauma resulting in a hemorrhaging wound, and other wound. For example, in contrast to an academic setting where internal organs are presented in isolation, in a reality, multiple organs are typically grouped in a particular arrangement, in a wet environment, and are connected to and/or covered with intersticial tissue reflections, fatty tissue, ligaments, etc. Further, various internal organs are enveloped or otherwise packaged in local membranes. For example, in the human body, the lungs are surrounded by the pleural membrane (thin layer of tissue that lines the pleural cavity, the space that surrounds the lungs and lies underneath the chest wall). Also for example, most of the intra-abdominal (or coelomic) organs are covered by the peritoneum (serous membrane forming the lining of the abdominal cavity composed of a layer of mesothelium supported by a thin layer of connective tissue, which supports many of the abdominal organs and serves as a conduit for their blood vessels, lymphatic vessels, and nerves). Also for example, the small intestines are covered by the greater omentum which doubles back to ascend to the transverse colon before reaching to the posterior abdominal wall (large apron-like fold of visceral peritoneum that hangs down from the stomach). Also for example, hanging down from the liver is the lesser omentum (which is smaller than the greater omentum).

Laparoscopic surgery, also called minimally invasive surgery (MIS), is distinguished from the more common, open surgery, as laparoscope surgery is performed remotely. In particular, a laparoscope and other miniature surgical tools are inserted into a small incision in the body, and viewing/operating on the affected area is performed by snaking the cable from the remote, but more easily accessible location outside of the patient's body. This is typically performed in a clinical setting.

In contrast, in open surgery, the surgeon is present before the patient's body and interacts directly with it (e.g., slicing and manually prying away any membranes and fatty tissue to gain visual and manual access to the organ/area of interest. Further, trauma surgery includes additional complications and urgency not typically found in a planned surgery (e.g., internal bleeding, bullet wounds, burns, etc.). Trauma surgery (particularly in combat conditions) may take place outdoors and with multiple complicating factors (open flow bleeding, noise, explosions, unrelated 3rd parties in the vicinity, etc.).

In this context, and of particular importance for the present invention, are those medical procedures that are required for response to a life-threatening, emergency situation. The import here is two-fold. Firstly, the partial task simulator should effectively augment the educational background that is necessary to assess an emergency situation. Secondly, it should serve as a tool with which a person can learn how to respond to an emergency situation by properly performing essential life-saving tasks. The efficacy of any partial task simulator or training aid, however, is dependent on the realism it provides and its ability to simulate or mimic an environment where the task is to be actually performed.

With the above in mind, a catastrophic event presents a situation wherein the proper training of emergency medical personnel can be invaluable. Regardless whether the event is the result of an accident, a natural disaster or some form of combat, the consequence of a first response to the event may make the difference between life and death. In such instances, the ability of medical personnel to rapidly and reliably attend to wounds and injuries is of crucial importance. Practice on partial task simulators such as medical mannequins, while valuable as teaching aids, are limited by the mannequin's immobility, weight, expense and minimal interaction with the medical personnel.

In light of the above, it is an object of the present invention to provide a device for realistically and dynamically simulating the wounds and injuries on a person (e.g., role player, actor) that can be received during a traumatic event. Another object of the present invention is to provide a device that effectively functions as a training aid to teach a person how to treat the wounds and injuries that can be received by a person during a traumatic event. Another object of the present invention is to provide a device that effectively functions as a training aid that allows verbal and gesticular interaction between a live human wearing the device and a first responder who is treating the person wearing the device. Still another object of the present invention is to provide a training aid for teaching how to treat wounds and injuries that is easy to use, is simple to manufacture and is comparatively cost effective. Yet another object of the present invention is to provide a field deployable training tool for advanced surgical skills training which may be remote from a preparation facility.

SUMMARY OF THE INVENTION

A prosthetic internal organ module for a surgery simulator is disclosed herein. The prosthetic internal organ module includes: a prosthetic organ platform; a plurality of prosthetic internal organs attached to the prosthetic organ platform in an anatomically correct arrangement; and an anterior cover made of membrane-like material, said anterior cover positioned over the plurality of prosthetic simulated organs, and attached to the organ platform such that the plurality of prosthetic simulated organs are packaged together between the module frame and the anterior cover.

According to one embodiment, a package for open surgery training is disclosed herein. The package for open surgery training includes: a plurality of prosthetic internal organs, a fluid delivery system, a module frame, and an anterior cover. The fluid delivery system includes an exposed inlet, an outlet, and at least one fluid channel between the exposed inlet and the outlet. The fluid delivery system configured to plumb a simulated blood from the exposed inlet to the outlet. The module frame includes a base and a center frame, with the base configured to anchor the plurality of prosthetic internal organs in an anatomically correct arrangement, and the center frame configured to route the fluid delivery system to a simulated bleeding location. The anterior cover made of membrane-like material. Further, the anterior cover is positioned over the plurality of prosthetic simulated organs, and is attached to the module frame such that the plurality of prosthetic simulated organs are packaged together between the module frame and the anterior cover.

According to another embodiment, an advanced surgical skills package is disclosed herein. The advanced surgical skills package includes: a plurality of prosthetic internal organs; a prosthetic omentum; a fluid delivery system including an exposed inlet, an outlet, and at least one fluid channel between the exposed inlet and the outlet; a module frame including a base and a center frame; and an anterior cover made of membrane-like material. The fluid delivery system is configured to plumb a simulated blood from the exposed inlet to the outlet. The base is configured to anchor the plurality of prosthetic internal organs in an anatomically correct arrangement. The center frame is configured to route the fluid delivery system to a simulated bleeding location. The anterior cover is positioned over the plurality of prosthetic simulated organs, and is attached to the module frame such that the plurality of prosthetic simulated organs are packaged together between the module frame and the anterior cover. The anterior cover includes a manually pliant first elastomer sheet configured to substantially enclose the prosthetic simulated organs against the base of the module frame. The plurality of prosthetic simulated organs includes a prosthetic simulated liver having a body formed with a simulated bleeding injury, an orifice attached to said simulated bleeding injury, with the prosthetic simulated liver attached to the fluid delivery system and forming an open fluid path for the simulated blood to bleed out of orifice attached to the simulated bleeding injury upon delivery of the simulated blood via the fluid delivery system. The plurality of prosthetic internal organs further includes a prosthetic gastrointestinal tract. The prosthetic gastrointestinal tract includes an internal cavity configured to hold a simulated bodily fluid, and a valve in fluid communication with the internal cavity, with the valve configured to provide for filling and sealing the simulated bodily fluid within the internal cavity of the prosthetic gastrointestinal tract. The anterior cover further includes a prosthetic peritoneum configured to cover the prosthetic simulated liver and to substantially cover the prosthetic gastrointestinal tract. The a prosthetic omentum is attached to the prosthetic gastrointestinal tract and positioned between the prosthetic gastrointestinal tract and the prosthetic peritoneum. The base of the module frame includes a second elastomeric sheet, with the second elastomeric sheet being thicker that the first elastomeric sheet. The first elastomeric sheet of the anterior cover is attached to the second elastomeric sheet of the base via an adhesive bond about a shared periphery of both the first elastomeric sheet and the second elastomeric sheet.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 8 is a front view of an exemplary module frame of a prosthetic organ module, according to one embodiment of the present disclosure.

FIG. 9 is a side view of the module frame of FIG. 8.

DETAILED DESCRIPTION

Figure 1:
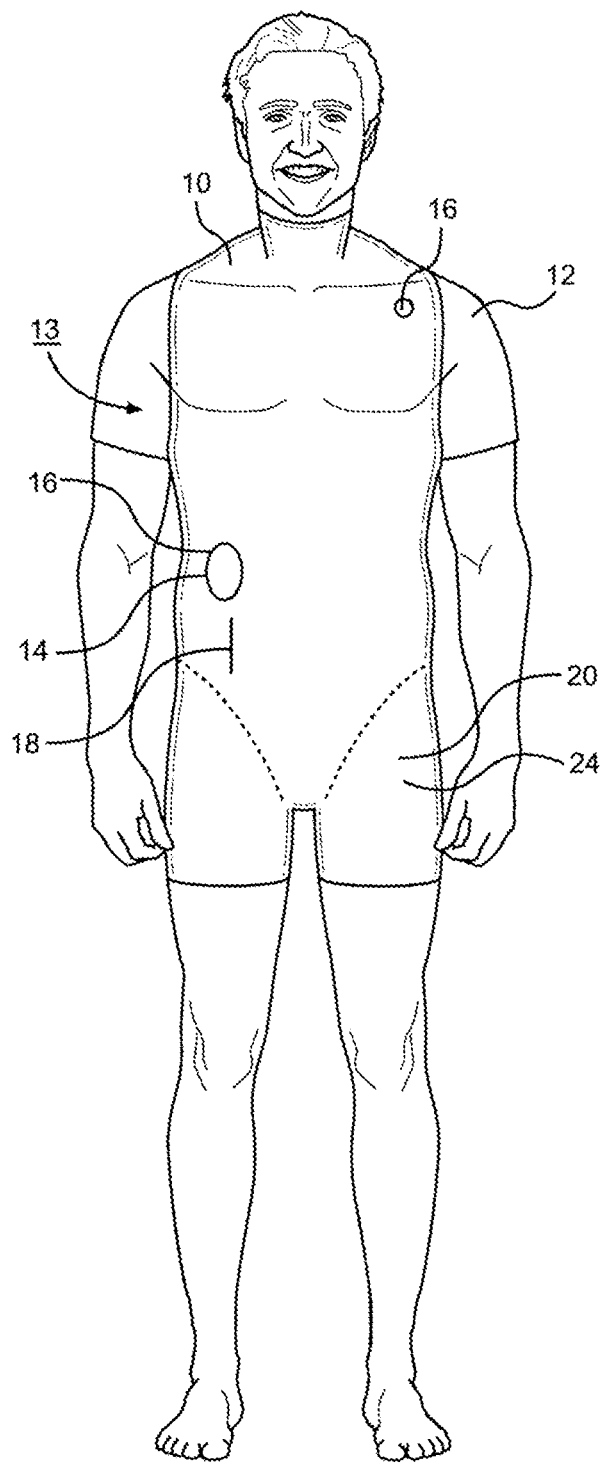
FIG. 1 is a front view of a raiment mounted on a human body, according to one embodiment of the present disclosure.

In accordance with the present disclosure, a partial task surgical simulator (training aid device) is provided for simulating the wounds and injuries on a role player, actor or model that could be received by a person during a trauma event. Specifically, the device includes a raiment fitting over strapped vests that are dimensioned to cover the torso of a person and therefore be worn by a person in a simulation. Further, the raiment can extend over the person's shoulders and upper arms, as well as over his/her groin area and upper thighs. Structurally, the raiment is made primarily of silicone and nylon fiber, and it is formed as a layer having an inner surface and an outer surface, with the outer surface having a color and a texture that is comparable to human skin. The vest is designed to fit under the raiment and on the torso of a body. Structurally, the vest is made primarily of silicone, nylon fiber, plastic and rubber materials, and it is formed as a shield portion covering the front and side of the torso held in place by straps. The vest provides a protective layer between the raiment and the model or actor. The vest is further designed to provide a detail of the internal structure of a human body, such as the rib cage and internal organs. The vest forms a cavity generally under and below the rib cage in which such prosthetic internal organs can be placed. The importance of the disclosure is that the simulator presents first responders with realistic-looking, dynamic medical effects that can simulate and mimic a plurality of different wounds and injuries.

As part of the presentation for simulating a trauma event, the device of the present disclosure comprises a wound simulator that can be selectively attached to the outer surface of the raiment. The wound simulator can then simulate either surface or penetrating wounds and injuries. For example, the wound simulator can be used to simulate surface injuries such as burns, scrapes, abrasions, or the effects of chemical, biological or nuclear agents, or the result of internal injuries from punctures and other injuries. Additionally, the wound simulator can be used to simulate penetrating injuries such as high and low velocity missile wounds caused by gunshot, shrapnel, and blunt/sharp object penetration.

In order to provide added realism for the simulation of penetrating wounds, the raiment is formed with at least one orifice on its outer surface. Further, the raiment includes at least one fluid reservoir that is formed into the layer of the raiment, between its inner and outer surfaces. Specifically, the reservoir is provided for holding a blood-like fluid, and it is connected in fluid communication with the orifice. Thus, the person who is wearing the raiment can selectively expel the blood-like fluid from the reservoir and through the orifice, merely by squeezing the reservoir, to simulate bleeding. Depending on the particularly desired presentation, a wound simulator may be juxtaposed with the orifice to simulate bleeding from the wound.

In addition to the outward appearances of traumatic wounds and injuries mentioned above, the present disclosure also employs prosthetics to mimic certain internal organs and anatomical structures that may be affected by the trauma event. These prostheses are made of composite materials such as open or closed cell polyurethane foam of various densities, elasticity, and deformation characteristics to simulate internal organs. Specifically, these prostheses can be used to mimic torso injuries (e.g., abdominal, upper torso; as well as other injuries, such as thorax wounds/injuries).

For the simulation of penetrating wounds, the present disclosure includes access through the raiment, such as through an orifice, to internal organs within the cavity of the vest. Further, the orifice, wound simulators, reservoirs and internal organs are positioned and juxtaposed to simulate various injury scenarios, which may be selectively done. For example, the organs may include a predetermined length of flexible tubing that is comparable in appearance and texture to intestines. When used, this pseudo intestine is positioned between the vest and the inner surface of the raiment. Further, a portion of the pseudo intestine can be juxtaposed with at least one orifice in the raiment for use in simulating the penetrating abdominal wound within the torso cavity. Similar simulations can be used for various upper torso injuries (e.g., lungs, heart, kidneys, stomach, etc.).

Referring initially to FIG. 1, a simulator in accordance with the present disclosure is shown and designated 13. As shown, a raiment in accordance with the present disclosure is also shown and designated 10. As shown, the raiment 10 is dimensioned and fitted to cover a person 12 (e.g., person, role player, actor, model). As such, the raiment 10 is a base member of the simulator 13. More specifically, the raiment 10 is intended to be wearable by a person. Accordingly, it is intended to cover the torso of a person 12, and to extend over the shoulders, upper arms, groin area and upper thighs of the person 12. For purposes of this disclosure, the person 12 is shown in FIG. 1 to present these anatomical features. FIG. 1 also indicates that a wound simulator 14 can be used with the raiment 10, and that the raiment 10 can be formed with an orifice 16 from which a blood-like fluid 18 can be expelled. For example, the wound simulator 14 can be used to simulate surface injuries such as burns, scrapes, abrasions, radiation, or the result of internal injuries from punctures and other injuries. Additionally, the wound simulator 14 can be used to simulate penetrating injuries to the internal cavity of the human torso. As further shown in FIG. 1 (and FIGS. 3A and 3B), blood-like fluid 18 may be expelled in various ways (e.g., patches, spots, drops, drips, puddles, ooze spots).

As further shown in FIG. 1, the raiment 10 is made of a layer 20 having an outer surface 24. Preferably, the layer 20 is made of a silicon material that contains nylon fibers. However, other materials may also be used, such as carbon fibers, other composite materials, latex and other rubber materials. In any event, the layer 20 must be sufficiently flexible to allow it to be worn by a person 12 as the person 12 moves to mimic the motions of a severely injured victim of a traumatic event. For this purpose, the outer surface 24 of the raiment 10 is preferably colored and textured to simulate human skin. In alternative embodiments, portions of inner layer 22 may be resin coated to protect the person 12 from being cut, such as by a surgical instrument in simulating trauma events and response to trauma events.

Figure 2A:
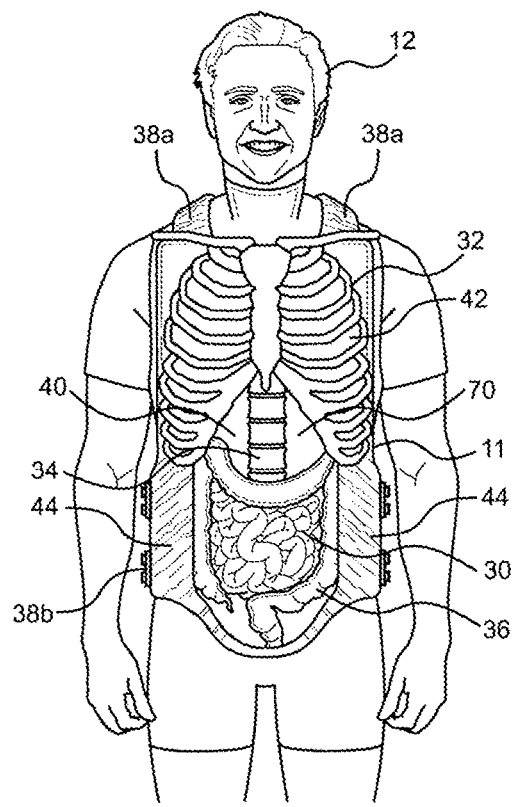
FIG. 2A is a perspective view of a vest mounted on a human body, according to one embodiment of the present disclosure.

Referring to FIG. 2A, a vest in accordance with the present disclosure is also shown and designated 11. As shown, vest 11 is dimensioned to fit on the torso of a person 12 underneath the raiment 10. Vest 11 is fitted onto a person 12 by portions 40, 42 and 44 and straps 38a and 38b. More specifically, vest 11 has a first portion 40 covering at least part of the chest of a person 12. Portion 40 is akin to a shield. Portion 40 may be used to protect the person 12 in the course of simulating trauma events and responses to trauma events. Accordingly, it may be made of rigid material, such as polyurethane resin or resin coated.

Vest 11 has a second portion 42 attached to the first portion 40 and forms a cavity 34 in the general area between the first and second portions 40, 42. Vest 11 also has third and fourth side portions 44 attached to the first portion 40 and covering at least part of the sides of the torso of a person 12. Portions 44 may be integrated into portion 40, such as being one continuous portion. Portions 44, 42 and 40 may also be integrated together into one piece constituting the major component of vest 11, other than straps 38. Portions 40, 42 and 44 may also be attached by various conventional mechanical means such as adhesives, fasteners, welding, melding and other joiners. Portions 40, 42 and 44 are preferably constructed of composite or plastic material, but other and additional materials may also be used, such as silicon material that contains nylon fibers, carbon fibers, other composite materials and latex and other rubber materials.

Figure 2B:
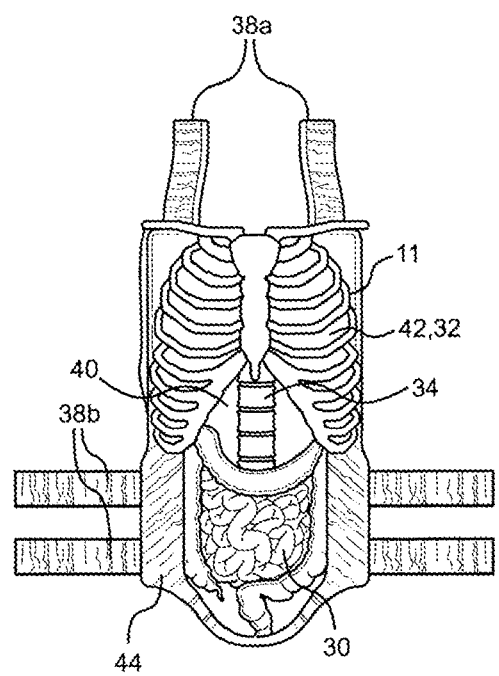
FIG. 2B is a front view of a vest, according to one embodiment of the present disclosure.

As shown in FIGS. 2A and 2B, portions 40 and 44 have front and back sides 70, 72. In general, the back sides 72 face towards person 12 and the front sides 70 face away from person 12. As also indicated in FIGS. 2A, 2B and 2C, front side 70 of portions 40 and 42 may be colored or textured to mimic or otherwise resemble the internal cavity of the torso of a body.

Figure 2C:
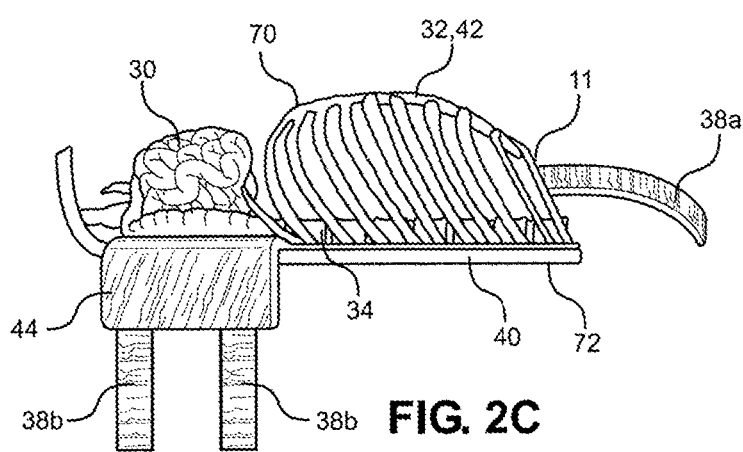
FIG. 2C is a side view of a vest, according to one embodiment of the present disclosure.

Also, as shown in FIGS. 2A, 2B and 2C, portion 42 is preferably made as an artificial rib cage 32. As such, portion 42, as rib cage 32, is a prosthetic resembling a human rib cage. Portion 42, including as rib cage 32, is positioned against the inner surface 22 of the raiment 10 (see also FIGS. 3A, 3B, 4) to simulate a skeletal structure. As also shown, at least one prosthetic internal organ 36 (e.g., intestine 30) is positioned within the cavity 34 of the vest 11.

Figure 4:
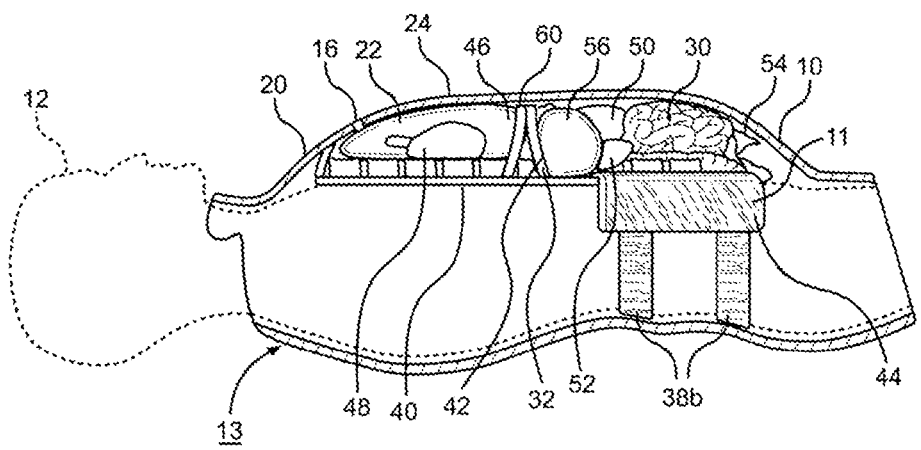
FIG. 4 is side view of a simulator mounted on a human body with a cut away view of the vest underneath the raiment, according to one embodiment of the present disclosure.
Figure 5:
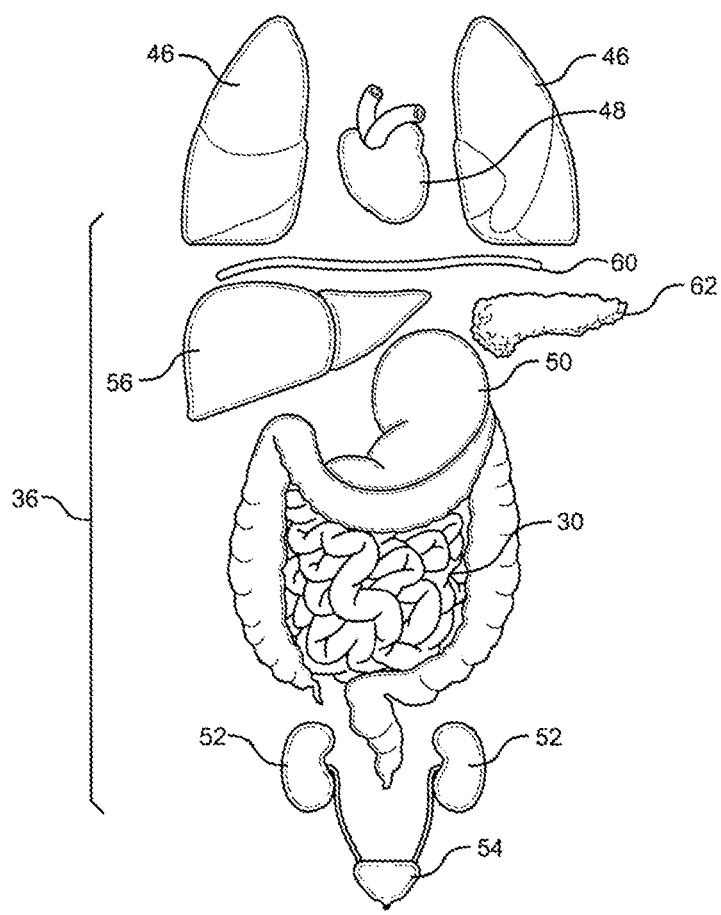
FIG. 5 is an exploded view of prosthetic internal organs, according to one embodiment of the present disclosure.

The one or more prosthetic internal organs 36 (e.g., intestine 30 as shown in FIGS. 2A, 2B, and 2C; lungs 46, heart 48, stomach 50, kidneys 52, bladder 54, liver 56, diaphragm 60 and spleen 62 as shown in FIGS. 4 and 5) are attached to vest 11 by fittings, adhesives, fasteners, welding, melding and other joiners. Alternatively, one or more prosthetic internal organ 36 may be positioned within cavity 34 of vest 11 without attachment to vest 11.

As further shown in FIGS. 2A, 2B and 2C, the vest 11 is intended to cover at least a part of the front of the torso of a person 12 and to fit over the person's shoulders or around the person's neck by straps 38a and around the torso of the person by straps 38b. Straps 38a are secured to portion 40 of vest 11 and may be secured together or to other straps by various well known means (e.g., buckles, ties, Velcro, etc.). Straps 38b are secured to portion 40 or 44 of vest 11 and may be secured together or to straps 38a in the same fashion.

Figure 3A:
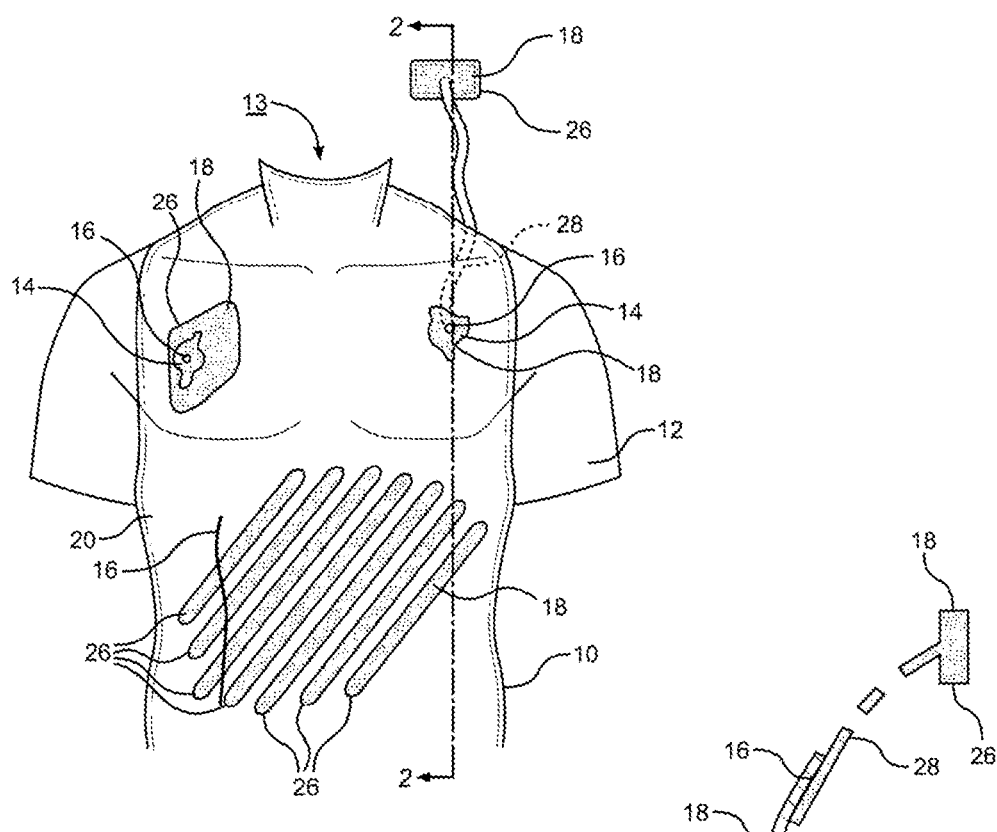
FIG. 3A is a perspective view of a simulator with cut away views to show internal features of the raiment, according to one embodiment of the present disclosure.
Figure 3B:
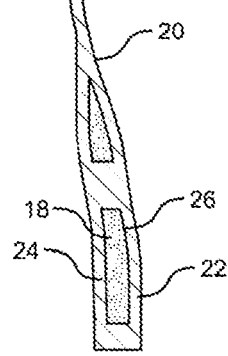
FIG. 3B is a cross sectional view seen along line 2-2 in FIG. 3A.

The structural aspects of the raiment 10 will be more fully appreciated by referencing FIGS. 3A and 3B. There it will be seen that layer 20 of the raiment 10 has inner surface 22 in addition to an outer surface 24. FIGS. 3A and 3B show that the layer 20 of raiment 10 can be formed with one or more reservoirs 26 for holding the blood-like fluid 18 therein. As shown, reservoirs 26 may be embedded in raiment 10 between inner and outer surfaces 22 and 24 or covered by raiment 10. Reservoirs 26 may constitute any shape, including generally rectangular or circular pockets (over the right chest area of person 12 in FIG. 3A), strand like pockets (over the stomach area of person 12 in FIG. 3A) or separate containers (over the left shoulder of person 12 in FIG. 3A). Reservoirs 26 may be attached to raiment 10 by fluid channels 28. Fluid channels 28 preferably constitute flexible tubing mounted under the outer surface 24 of the raiment 10 and may extend and join to reservoirs 26 proximate to or distant from the raiment 10. Tubing for fluid channels 28 may be of predetermined length. Fluid channels 28 constituting such tubing may be positioned against the inner surface 22 of the raiment 10 with a portion thereof juxtaposed with at least one orifice 16. For example, a fluid channel 28 is provided to connect the reservoir 26 in fluid communication with the orifice 16 for use in simulating a penetrating internal wound. Importantly, the reservoir 26 is positioned so it can be squeezed by a hand of a limb of the person 12 who is wearing the raiment 10. Reservoir 26 may be also positioned to be manipulated by the person 12 wearing the raiment 10 to expel blood like fluid 18 in alternative ways, such as by applying pressure with a limb to the reservoir 26 or by changing the position of person 12. This will then cause a portion of blood-like fluid 18 to be expelled from the reservoir 26 and through the orifice 16 to simulate bleeding. As shown, wound simulator 14 may be further aligned with orifice 16 to further simulate the injury, wound or other trauma event.

As shown further in FIG. 3B, reservoir 26 may be filled with blood like fluid 18 and may further be refillable via conventional means, such as filling fluid 18 into reservoir 26 via the same opening for connection of reservoir 26 to channel 28. Or reservoir 26 may be a separate container or pocket with a separate opening for filling reservoir 26 with fluid 18. As such, reservoir 26 may be used to expel fluid 18 for multiple uses. Reservoirs 26 are also preferably replaceable for multiple uses of simulator 13 to simulate multiple trauma events.

Referring back to FIG. 1, it will be appreciated that wound simulator 14 can be juxtaposed with the orifice 16 to simulate a bleeding abrasion. On the other hand, the orifice 16 can be presented as a puncture wound, substantially as shown in FIG. 1, without a surrounding wound simulator 14. By further example, orifice 16 can also present an opening to the cavity 34 of vest 11 to display and access one or more prosthetic internal human organs 36 during simulation of a penetrating wound to the human body. As intended for the present disclosure, the orifice 16 and the wound simulator 14 can be located anywhere on the raiment 10, as desired, to simulate a plurality of different wound/injury presentations. Also, the wound simulator 14 can be used alone to simulate gas or liquid agent injuries.

In addition to the superficial wound/injury presentations disclosed above, the present disclosure also envisions presentations for internal injuries. Specifically, with reference to FIGS. 4 and 5, it will be seen that the present disclosure includes various prostheses for use in simulating wounds/injuries that might be received in a trauma event. These prostheses include: a prosthetic intestine 30, a prosthetic rib cage 32, prosthetic lungs 46, a prosthetic heart 48, a prosthetic stomach 50, prosthetic kidneys 52, a prosthetic bladder 54, prosthetic liver 56, prosthetic diaphragm 60 and a prosthetic spleen 62. In detail, for example, the prosthetic intestine 30 is a length of flexible hosing that is made to resemble a real intestine. Such flexible hosing may be used as fluid channel 28 or reservoir 26 to selectively expel blood like fluid 18. Alternatively, fluid channel 28 and reservoir 26 may be selectively attached to the hosing of intestine 30 to simulate bleeding from the intestine 30 during simulation of a trauma event. Similar arrangements can be made with respect to any of the organs 36.

Preferably, the prosthetic internal organs 36 (30, 46, 48, 50, 52, 54, 56, 60, 62) and rib cage 32 are made from composite, plastic or rubber materials. These prostheses of internal organs 36 (30, 46, 48, 50, 52, 54, 56, 60, 62) are most preferably made of composite materials such as open or closed cell polyurethane foam of various densities, elasticity, and deformation characteristics to simulate internal organs. Other and additional materials may also be used, such as silicon material that contains nylon fibers, carbon fibers, other composite materials and latex and other rubber materials. The prosthetic rib cage 32 is preferably made from rigid material, such as rigid polyurethane resin material. In use, both the prosthetic rib cage 32 and any desired combination of prosthetic internal organs (30, 46, 48, 50, 52, 54, 56, 60, 62) are positioned between the body of the person 12 (actor) who is wearing the raiment 10, and the inner surface 22 of the raiment 10 within the cavity 34 of the vest 11.

As shown in FIG. 4, and also in connection with FIGS. 3A and 3B, internal prosthetic organ(s) 36 may be positioned proximate to at least one orifice 16 and at least one fluid reservoir 26 for simulation of a penetrating wound to the human torso. In use, the raiment 10 of the present disclosure can be used with any combination of superficial wounds/injuries disclosed above. Specifically, there may be a plurality of reservoirs 26, with a corresponding number of orifices 16. Likewise, a plurality of wound simulators 14 can be used.

The prosthetics of organs 36 (i.e. intestine 30, rib cage 32, lungs 46, heart 48, stomach 50, kidneys 52, bladder 54, liver 56, diaphragm 60, spleen 62 (see FIG. 5) and thorax described below may, or may not, be used, as desired. The prosthetic organs 36 may be combined within the cavity 34 in various combinations to simulate wounds and injuries. FIG. 4 shows a preferred embodiment including a large group or package of organs 36. Further, the prosthetic organs 36 may be combined into such packages and formed to represent certain wounds and injuries. For example, a package may be assembled to simulate injuries to the lungs 46 and heart 48 and another package may be assembled to simulate injuries to the stomach 50 and liver 56. The prosthetic organs 36 and packages of prosthetic organs are interchangeable so that various injury scenarios can be simulated. The wound simulators 14, orifices 16, channels 28 and reservoirs 26 are similarly interchangeable and positionable in alternative arrangements so that various injury scenarios can be simulated. And, as explained above, the positions of the wound simulators 14, orifices 16, channels 28, reservoirs 26 and organs 36 may be selectively juxtaposed to simulate various wounds and injuries. Collectively, the component elements of the present disclosure are intended to be used to simulate or mimic the various wounds/injuries that are likely to be received by a person involved in a traumatic event.

Figure 6:
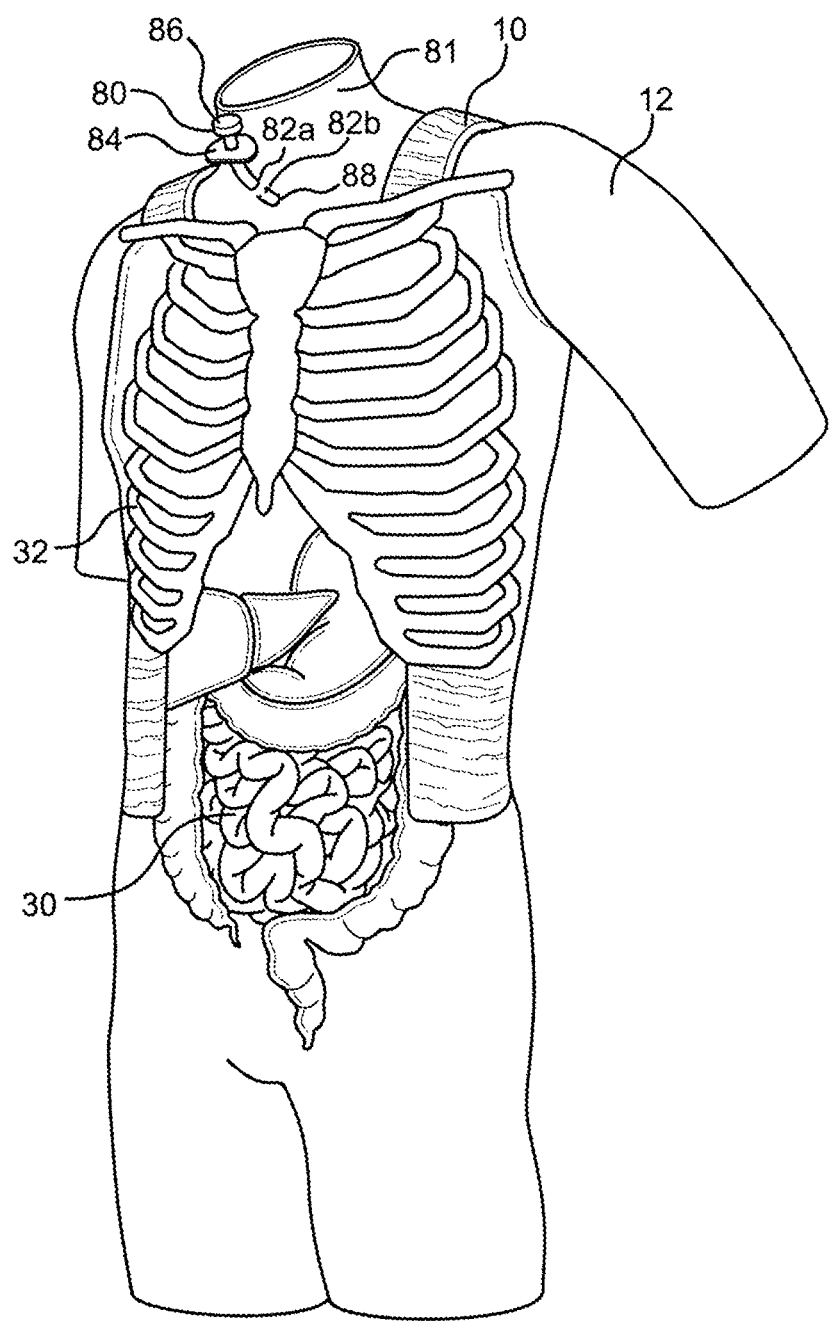
FIG. 6 is a perspective view of the prosthetic thorax, according to one embodiment of the present disclosure.

As shown in FIG. 6, in alternative embodiments, penetrating injuries to the thorax can also be simulated by mounting a prosthetic thorax 80 under or on the raiment 10 in the area of the neck of the person 12. In detail, the prosthetic thorax 80 is held on a bib 81 by retaining straps 82a and 82b, and the bib 81 is mounted or fitted around the neck of person 12. For example, bib 81 can have straps, ties, Velcro or other fasteners to secure bib 81 at the back of the neck of person 12. The prosthetic thorax 80 and bib 81 can fit underneath or over raiment 10. Structurally, the prosthetic thorax 80 includes an elongated hollow tube-like member 84 that has an open end 86 and a closed end 88. For use, the tube 84 is presented on the bib 81, and the bib 81 is positioned on the throat of the person 12 with the open end 86 positioned for receipt of a cricothyroid tube (not shown). Thus, the prosthetic thorax 34 can be used for simulating an invasive surgical placement of a cricothyroidotomy. Operationally, the tube-like member 40 is held on the raiment 10 to mimic a thorax, and to present its open end 86 for access thereto with a chest tube during a simulation of a penetrating wound to the thorax. These prostheses can be made of plastic, rubber or composite materials, such as open or closed cell polyurethane foam of various densities, elasticity, and deformation characteristics to simulate internal organs.

Use of the wearable partial task surgical simulator 13 as a teaching aid is accomplished by using the simulator 13 on a person 12 who portrays an injured person in a trauma event. The simulator 13 dynamically simulates the wounds and injuries the person 12 received during the simulated traumatic event. The simulator 13 is set up to simulate a trauma event among various possible scenarios. Simulator 13 allows verbal and gesticular interaction between person 12 wearing the simulator 13 and a first responder (e.g. trainee, trainer, other participant) who is treating the person 12 wearing the simulator 13.

Accordingly, in using the partial task surgical simulator 13 as a teaching aid, the raiment 10 is provided with at least one wound simulator 14 related to the simulated trauma event and at least one fluid reservoir 26 for holding a blood-like fluid 18 and is in fluid communication with at least one orifice 16. The vest 11 is provided on person 12 underneath the raiment 10 and provides simulation of the internal skeletal structure (e.g., rib cage 32) and internal organs (e.g., prosthetic organs 36) of the person 12 simulating injury in the trauma event. Person 12 selectively expels the blood-like fluid 18 from the reservoir 26 and through the orifice 16 to simulate the trauma event. Simulator 13 is used to mimic a penetrating wound by positioning a predetermined length of flexible tubing (e.g., intestine 30 or fluid channel 28) against the inner surface 22 of the raiment 10 with a portion thereof juxtaposed with the orifice 16 of at least one superficial wound. At least one fluid reservoir 26 is attached to a length of flexible tubing (e.g., fluid channel 28) attached to the raiment 10 and reservoir 26 is manipulated to expel blood-like fluid 18. A first responder selectively accesses at least one prosthetic internal human organ 36 in the cavity 34 through at least one orifice 16 of the raiment 10 during simulation of a penetrating wound to the human body. The prosthetic human internal organs 36 are selected from among multiple combinations of prosthetic human internal organs 36 and used in the cavity 34 of the vest 11 to simulate from among various internal organ structure injuries involved in a selected trauma event.

Figure 7:
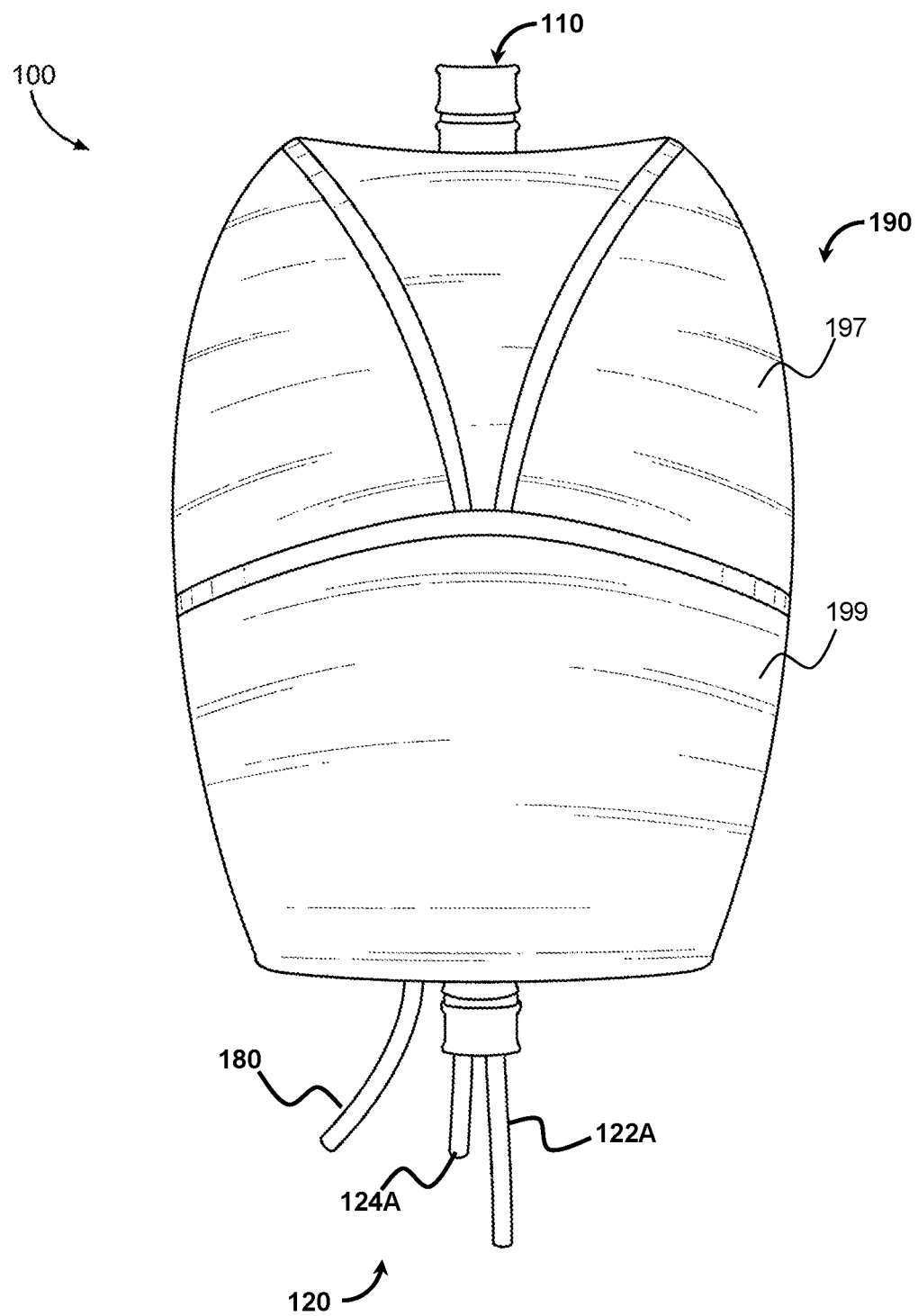
FIG. 7 is an exemplary embodiment of a prosthetic organ module with wound simulation capabilities, according to one embodiment of the present disclosure.

Referring now to FIG. 7, an exemplary embodiment of a prosthetic internal organ module is shown and generally designated 100. Generally, the prosthetic internal organ module 100 may include and enclose, or otherwise package a plurality of prosthetic organs, which simulate the internal organs of a human including the shape, color, and texture. The prosthetic internal organ module 100 may include all, or some of the internal organs of a human, depending on the needs of the simulation. As shown, the prosthetic internal organ module 100 may include a module frame 110 configured to support/anchor/position the prosthetic internal organs, and an anterior cover 190 substantially covering all of the prosthetic internal organs.

As discussed below, the anterior cover 190 may be configured to provide for tactile feedback when cut (e.g., allowing trainees to feel organs underneath), and to provide realistic simulation of the operation. For example, the anterior cover 190 may be a thin, soft, pliable sheet made from an elastomeric material (e.g. thin silicone sheet) or other similar membrane-like material. Accordingly, the anterior cover 190 may include, or otherwise include portions associated with, a prosthetic pleural membrane 197 and a prosthetic peritoneum 199 substantially covering all internal organs as shown. Alternately, it is understood that the anterior cover 190 may other combinations, depending on the needs of the simulation, as discussed below.

The prosthetic internal organ module 100 may further include a fluid delivery system 120. In particular, and as discussed below, the fluid delivery system 120 may be configured for bleeding and/or body fluid release, and may be initiated by severing tissue or valve opening, respectively. Advantageously, the fluid delivery system 120 may provide the capabilities to simulate an internal injury by providing point-of-contact bleeding simulation. Further, each prosthetic internal organ may also have its separate capability to simulate an injury.

According to one embodiment, the prosthetic internal organ module 100 may be packaged and dimensioned to fit within the cavity 34 of the vest 11. In particular, the prosthetic internal organ module 100 may include a plurality of realistic organs positioned and arranged as found in the human body, which is then enclosed as a single insertable and removable unit. Advantageously, the prosthetic internal organ module 100 may then be inserted into the cavity 34 of the vest 11 and provide realistic simulation of human organs with the capabilities of simulating injury. Further, in addition to the organs themselves, the prosthetic internal organ module 100 may provide for further realism by including more complex features such as fatty tissue, connecting/anchoring tissue, and membranes observable when the abdominal cavity is opened anteriorly. Advantageously, this may provide additional realism both in appearing as an actual human body would, and in requiring a trainee to cut through and manipulate diverse additional tissue and materials in an open surgery environment before even locating and reaching the simulated injury, thus requiring advanced surgical skills.

The prosthetic internal organ module 100 is not limited to be used with the simulator only, but may be inserted into any other human simulator with a cavity. In particular, the package may be an integrated, self-contained unit, configured to fluidly couple with one or more fluid supplies. Thus, it is contemplated that the prosthetic internal organ module 100 may be used independently from the vest 11, and utilizes only the raiment 10. Similarly, it is also contemplated that the prosthetic internal organ module 100 may be used independently to simulate specific internal injuries without the encumbrances of a simulated skeletal structure.

Referring now to FIG. 8 and FIG. 9, a module frame is shown and generally designated 110. Generally, the module frame 110 may be a platform configured to support and position the organs (and extra tissue) within the module. Further, the anterior cover 190 (FIG. 1) may be attached to the module frame to enclose some or all of the organs as a package, which may then be treated as an individual unit. According to one embodiment, the module frame 110 may be a durable component that is reusable over many operations, whereas the anterior cover 190 is a consumable component that is replaced each operation.

According to the illustrated embodiment, the module frame 110 may include a center frame 112 attached to a base 118. In particular, the base 118, may be configured to support/anchor/position the organs of interest, while the center frame 112 may be configured to route at least portions of the fluid delivery system 120. According to one embodiment, center frame 112 and/or the base 118 may be made of materials sufficiently durable to withstand many uses or duty cycles. For example, center frame 112 and/or the base 118 may be made of a durable, wear-resistant material and/or made with sufficient material quantity to last over a predefined useful life. Also for example, the base 118 may be a plate constructed of composite or plastic material, or other non-consumable material (i.e., over the platform's life-cycle).

Further, the base 118 may include a sheet of material sufficiently flexible to be inserted/retracted from a chest-sized cavity in a single motion. For example, the base 118 may be constructed of manually pliant or flexible material that allows for bending and other required deformations, such as silicone, rubber, and other elastomeric materials. Also for example, the base 118 may be constructed of manually pliable material or modifiable structure, such as resilient sheet of a memory material or an articulated assembly that can return to an initial configuration after bending or other manipulation.

According to one embodiment, the center frame 112 may be formed as a conduit, for example, having a central lumen 114 (shown in dashed lines) there through. In addition, the center frame 112 may function as a manifold, routing at least a portion of fluid delivery system 120 as needed. For example, the center frame 112 may include a plurality of ports 116 that provide access to the central lumen 114 from the outside of the center frame 112. This allows for passage of at least portions of the fluid delivery system 120 through the central lumen 114 of the central frame 112 and out the ports 116, to a designated location on the base 118. The use of a tube for the center frame 112 is not meant to be limiting, and it is contemplated that various other types of structures may be used for the center frame 112. According to one embodiment, the center frame 112 may include a tube simulating the spinal column of a human. As with the base 118, the center frame 112 may be configured to be sufficiently flexible to be inserted/retracted from a chest-sized cavity in a single motion. Alternately, where the center frame is not included, the spinal column of a human may be simulated and attached externally to the package, merely to provide more realism.

According to one embodiment, the fluid deliver system 120 may include a plurality of tubing. Preferably, the fluid delivery system 120 includes tubing 122 having an inlet 122A and an outlet 122B and tubing 124 having an inlet 124A and an outlet 124B. For reference and clarity, flow arrows have been added, but are not intended to be limiting. One or both of tubing 122 and tubing 124 may be configured to deliver a simulated blood (e.g., for bleeding wounds), however, any simulated human fluid appropriate to associated organs or delivery area may delivered (e.g., waste, bile, acid, interstitial fluid, etc.).

The tubing 122 and 124 may be inserted into the central lumen 114 of the center frame 112 and exit through one of the plurality of ports 116. The outlet 122B and 1246 of tubing 122 and 124, respectively, may exit through the corresponding ports 116 and be directed to a designated area of the module frame 110 where an injury is to be simulated.

By attaching the inlets 122A and 124A to a source of fluid, fluid may be delivered to the outlets 122B and 124B to simulate an internal bleeding injury. The fluid delivery system 120 is not meant to be limited to two tubes. It is contemplated that the fluid delivery system 120 may have one or more tubes, a network of tubing, a network of tubing and valves, or various other combinations of structures that allow for the delivery of a fluid.

As above, the module frame 110 may provide a platform that the prosthetic human organs are attached to. The prosthetic organs may be attached to the base 118 and/or to the center frame 112 by any convenient conventional means, such as fasteners, locks, adhesives, welding, melding and other joiners, or any other similar method. By attaching all of the prosthetic internal organs to the module frame 110, all of the prosthetic organs may be inserted and removed into the cavity 34 of the vest 11 in a single motion, as a single prepackaged unit. Advantageously this may provide for quick and easy maintenance of the simulator 13 and the prosthetic organs of the prosthetic organ module 100 after a simulation is completed. To illustrate, once a simulation is completed, prosthetic organs, prosthetic tissue, tubing, and at least portions of the anterior cover 190 may be destroyed, damaged, or otherwise consumed, however, being fixed to the module frame 110 the entire unit may be quickly and easily removed-and-replaced as unit. Further, the "used" prosthetic organ modules 100 may then be taken to a staging area to be rebuilt, repaired, repackaged, and/or reconfigured, providing minimal interruption to ongoing training.

Additionally, the module frame 110 may provide a platform that the anterior cover 190 (FIG. 1) or portions thereof are attached to. In particular, the anterior cover 190 may be attached to the base 118 or to the center frame 112 by various conventional means such as fasteners, locks, adhesives, welding, melding and other joiners, or any other similar method. For example, the anterior cover 190, or portions thereof, may be adhesively attached to the base 118 of the module frame 110. After use, the anterior cover 190 may then be cut away from the base 118. This may be particularly beneficial where both the base 118 and the anterior cover 190 are made of elastomeric materials or where fluids are to be retained in the prosthetic internal organ module 100 prior to cutting.

According to one embodiment, a plurality of anchors 128 may be attached to the back of the base 118. The anterior cover 190 may then be quickly and toollessly attached to the plurality of anchors 128 on the back the base 118. is. Similarly, the anterior cover 190 may be removed from the module frame 110 by decoupling from the plurality of anchors 128. Advantageously, a "consumed" or otherwise used anterior cover 190 may be readily removed and replaced.

Figure 10:
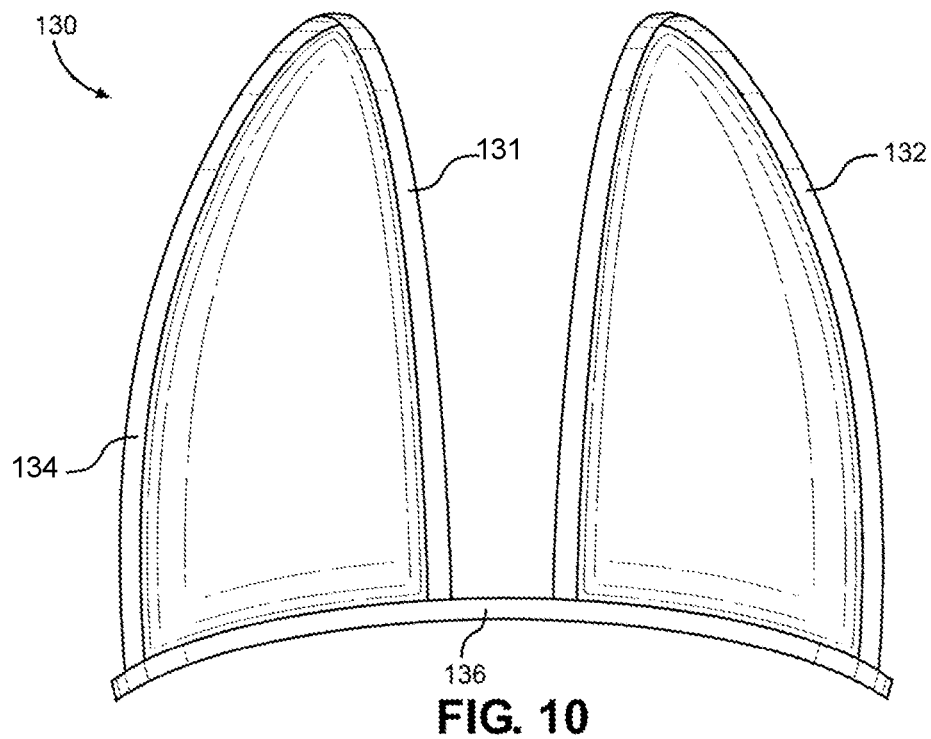
FIG. 10 is a front perspective view of a prosthetic lung of a prosthetic organ module, according to one embodiment of the present disclosure.
Figure 11:
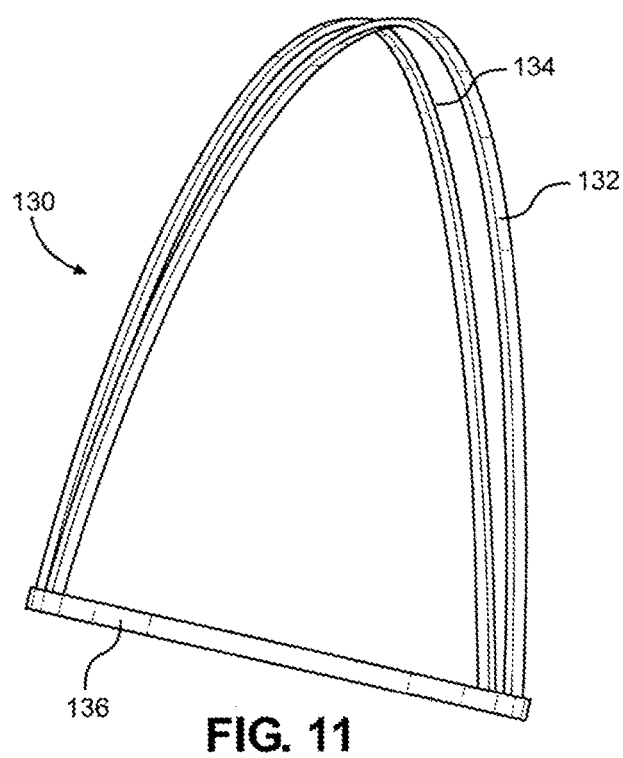
FIG. 11 is a side perspective view of the prosthetic lung of a prosthetic organ module of FIG. 11, according to one embodiment of the present disclosure.

Referring now to FIG. 10 and FIG. 11, a prosthetic lung is shown and generally designated 130. The prosthetic lung 130 is a three-dimensional frame 131 outlining the shape of a human lung. The three-dimensional frame 131 includes a right member 132 and a left member 134 attached to a bottom member 136. The right member 132 is curved to form the outline of a right lung and the left member 134 is curved to form the outline of a left lung. The bottom member 136 is curved into a semi-circular shape. The three-dimensional frame 131 provides support, and gives shape to a prosthetic pleural membrane 197 (shown in FIG. 7 and FIG. 16), which in combination simulates the shape of human lungs. It is contemplated that the prosthetic lungs 130 may be made of an alternative structure, including hollow forms, solid forms, and semi-solid forms to simulate the human lungs. It is also contemplated that the prosthetic lungs 130 may be made of inflatable material, similar to balloon. This prosthetic lung 130 will have a body with a hollow cavity and a valve attached to the body. The prosthetic lung will have the capability of inflating or deflating, thereby simulating a pneumothorax.

Figure 12:
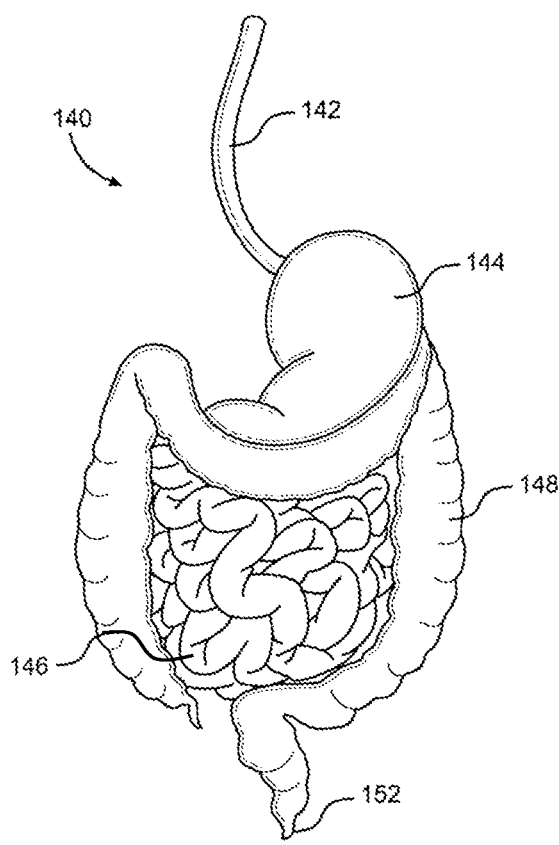
FIG. 12 is a front view of a prosthetic gastrointestinal tract of a prosthetic organ module, according to one embodiment of the present disclosure.

Referring now to FIG. 12, a prosthetic gastrointestinal tract is shown and generally designated 140. The prosthetic gastrointestinal tract 140 simulates a human gastrointestinal tract and may include a prosthetic esophagus 142, a prosthetic stomach 144, a prosthetic small intestine 146, and a prosthetic large intestine 148. It is contemplated that the prosthetic gastrointestinal tract 140 may be modified for a particular simulation and may not include all of the various organs associated with a human gastrointestinal tract.

The prosthetic gastrointestinal tract 140 may be formed with an internal cavity 150 (not shown) that may extend the entire length, or a portion, of the prosthetic gastrointestinal tract 140. The prosthetic esophagus 142 may have a closed end and the prosthetic large intestine 148 may be formed with a valve 152 sealing the internal cavity 150 of the prosthetic gastrointestinal tract 140, for example in a simulated rectum. Alternately, it is contemplated that the prosthetic esophagus 142 may be fitted with a valve or the prosthetic large intestine 148 may have a closed end. The internal cavity 150 may be capable of holding a bodily fluid. For example, fluid may be inserted within the internal cavity 150 through the valve 152, thus "charging" the internal cavity 150. Later during training, for example, upon puncturing the prosthetic gastrointestinal tract 140, the fluid within the internal cavity 150 will escape simulating a gastrointestinal injury, such as a severed intestine or punctured stomach.

Figure 13:
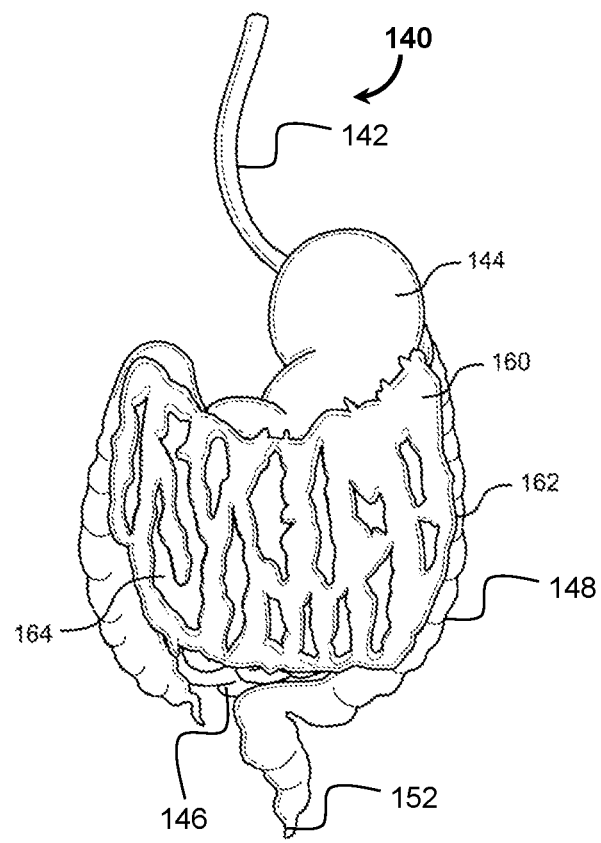
FIG. 13 is a front view of the prosthetic gastrointestinal tract of the prosthetic organ module with an attached prosthetic omentum, according to one embodiment of the present disclosure.

Referring now to FIG. 13, a prosthetic omentum is shown and generally designated 160. The prosthetic omentum may include a base layer 162 with texturing 164 applied to simulate a human omentum. The prosthetic omentum 160 may be attached to the prosthetic stomach 144 and positioned over the prosthetic small intestine 146 and the prosthetic large intestine 148.

Figure 14:
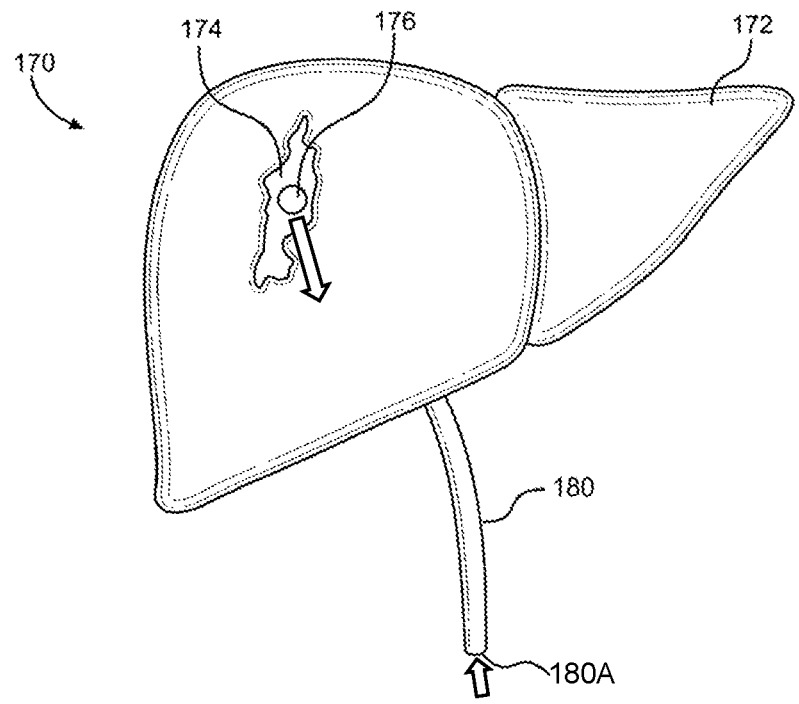
FIG. 14 is a front view of a prosthetic liver formed with a simulated injury of a prosthetic organ module, according to one embodiment of the present disclosure.
Figure 15:
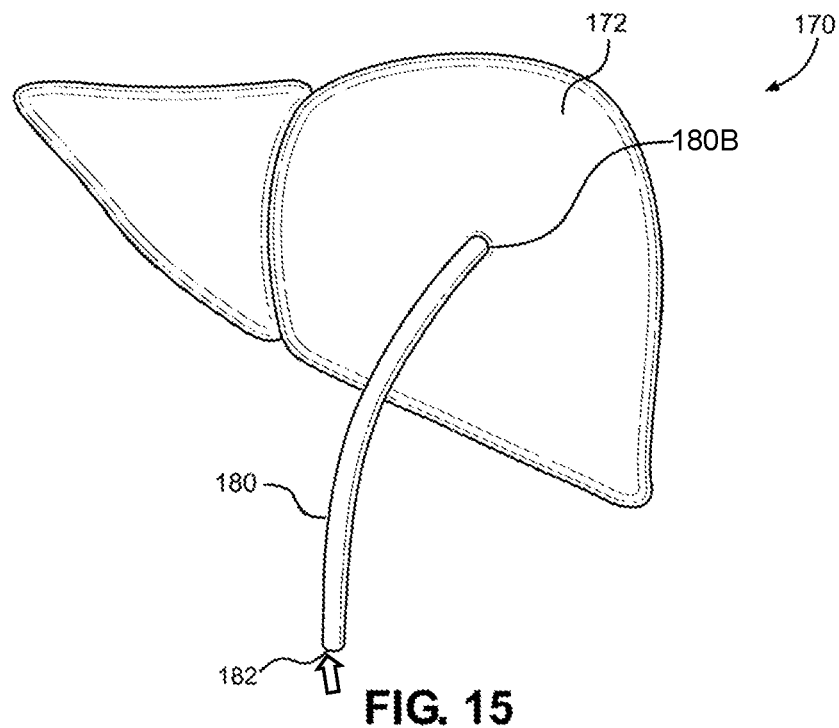
FIG. 15 is a back view of the prosthetic liver of FIG. 14.

Referring now to FIG. 14 and FIG. 15, a prosthetic liver is shown and generally designated 170. The prosthetic liver 170 may include a body 172 formed to resemble a human liver. In the preferred embodiment, the body 172 may be formed with a simulated injury 174, such as a laceration. Formed within the simulated injury 174 is an orifice 176, which is connected to a tube 180. The tube 180 has an inlet 180A and an outlet 180B, where the outlet 180B is connected to the orifice 176. By connecting the inlet 180A of the tube 180 to a source of fluid, fluid may flow through the tube 180 and out the orifice 176 to simulate a bleeding liver injury. As above, flow arrows have been added for reference and clarity, but are not intended to be limiting.

Figure 16:
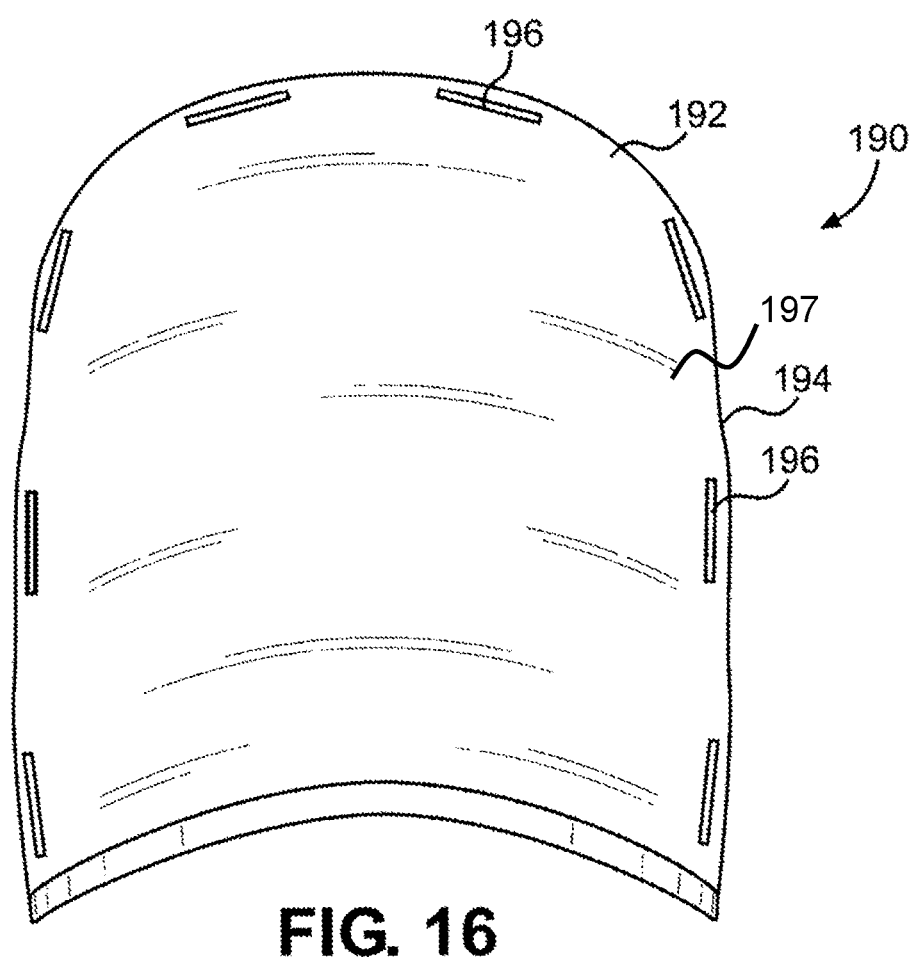
FIG. 16 is a front perspective view of a prosthetic pleural membrane of a prosthetic organ module, according to one embodiment of the present disclosure.

Referring now to FIG. 16, the prosthetic pleural membrane 197 of the anterior cover 190 is shown in isolation. As shown, the prosthetic pleural membrane 197 may include a sheet 192 having a periphery proximate a perimeter 194. It is understood that aspects of the prosthetic pleural membrane 197 discussed, may similarly apply to the anterior cover 190 in general, and/or the prosthetic peritoneum 199.

According to one embodiment, the prosthetic pleural membrane 197 may be made of material having mechanical properties close to or otherwise in simulation of a human pleural membrane. For example, the sheet 192 of the prosthetic pleural membrane 197 may be made of a membrane-like material, such as silicone or other elastomeric material. Further, the prosthetic pleural membrane 197 may be configured to look and feel like or otherwise in simulate of a human pleural membrane. For example, the sheet 192 may be made of a thing silicone sheet (or a similar material) that is semi-translucent, soft and stretchable, and readily cut with medical instruments.

According to one embodiment, the prosthetic pleural membrane 197 may be configured to attach to the module frame 110 at its periphery. For example, a plurality of anchors 196 may be attached adjacent to the perimeter 194 of the sheet 192 (or cut therethrough) that correspond with the anchors 128 of the module frame 110 (e.g., female/male connectors, straps, hook/loop, mating clips, positive/negative, etc.). Accordingly, the anchors 196 and 128 may be attached to each other, allowing the prosthetic pleural membrane 197 to be attached to the module frame 110. It is understood that various conventional attachment means are contemplated. It is further understood that, while the prosthetic pleural membrane 197 is illustrated as an independent membrane, it (like the prosthetic peritoneum 199) may be integrated with and merely represent a portion of the anterior cover 190.

Figure 17:
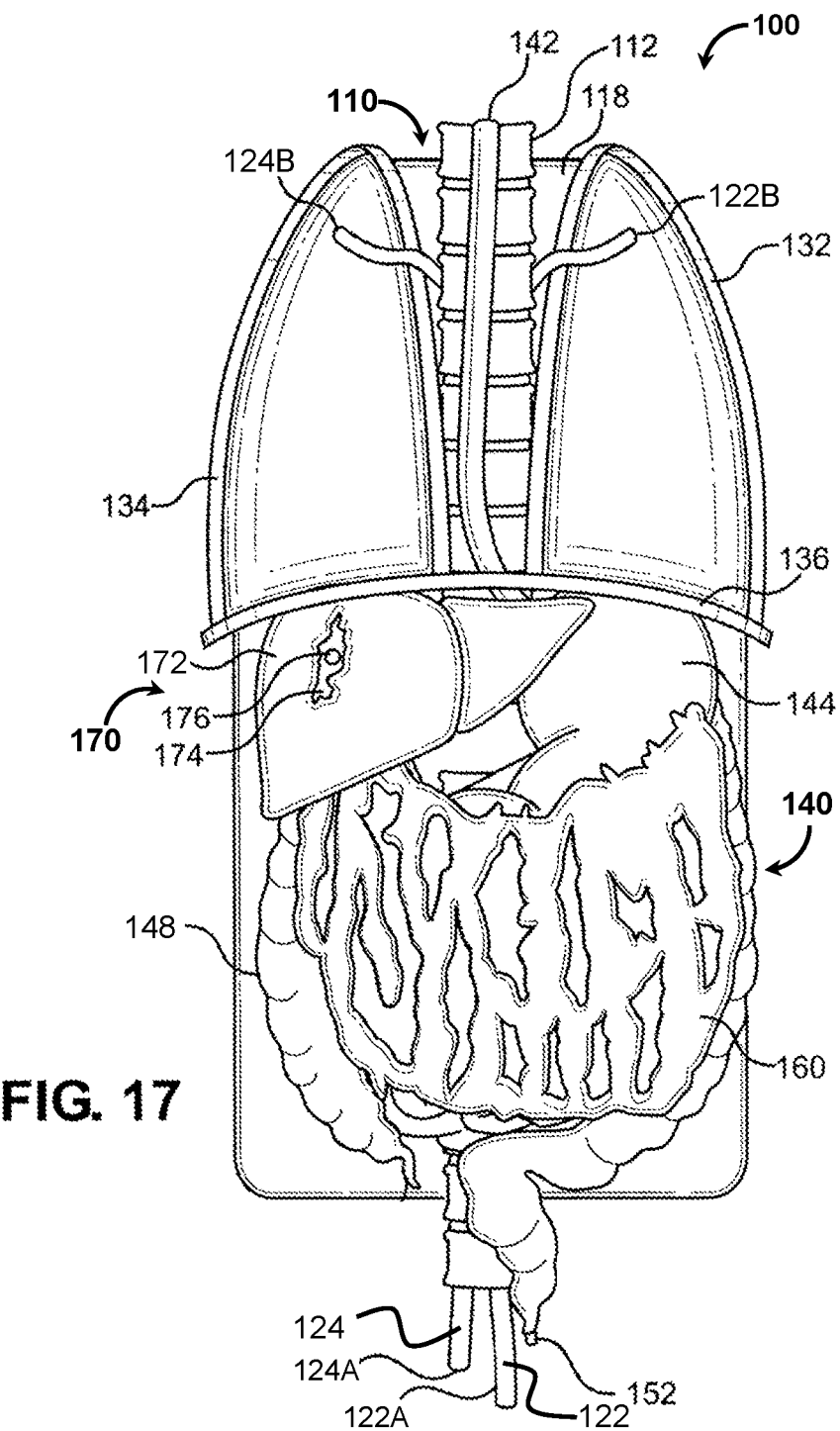
FIG. 17 is a front view of the prosthetic organ module with its anterior cover removed, according to one embodiment of the present disclosure.

Referring now to FIG. 17 the prosthetic internal organ module 100 is shown assembled with the entire anterior cover 190 removed (i.e., neither of the prosthetic pleural membrane 197 the prosthetic peritoneum 199, attached). As shown, the prosthetic organs are assembled and attached to the module frame 110 in accordance with human anatomy. Here, the outlets 122B and 124B of the tubing 122 and 124, respectively, are positioned to simulate a bleeding chest wound. The inlets 122A and 124A of the tubing 122 and 124, respectively, are left exposed to allow the connection to a fluid source (not shown). Accordingly, when packaged by the anterior cover 190 and connected to a simulated blood source, application of fluid flow may create the simulated bleeding chest wound, including internal bleeding, hemorrhaging, and the like.

Here, the gastrointestinal tract 140 is attached to the module frame 110, where the prosthetic esophagus 142 is attached to the center frame 122, and the prosthetic stomach 144, the prosthetic small intestine 146, and the prosthetic large intestine 148 are attached to the base 118. It is understood that many attachment combinations are possible and contemplated. As illustrated, a portion of the large intestine 148 may extend past the module frame 110, to allow access to the valve 152, for example. Also, and with reference to FIG. 18, the prosthetic peritoneum 199 (or related portion of the anterior cover 190) may cover the majority of the prosthetic small intestine 146 and prosthetic large intestine 148.

As illustrated, the prosthetic liver 170 may be attached to the module frame 110. The tube 180 is then positioned where the inlet 182 (FIG. 18) is left exposed to allow attachment to a fluid source. This will allow the delivery of fluid to the simulated injury 174 of the prosthetic liver 170 to simulate an injured liver. Alternatively, the tube 180 may be inserted through one of the ports 116 (FIG. 9) of the center frame 112 and exit the central lumen 114 (FIG. 8).

As illustrated, the prosthetic lungs 130 may be attached to the module frame 110. The prosthetic pleural membrane 197 or the anterior cover 190 (FIG. 18) may be placed over the assembled prosthetic organs attached to the module frame 110. Thus, the three-dimensional frame 131 (FIG. 10) of the prosthetic lung 130 provides support, and gives shape to the prosthetic pleural membrane 197 or the related portion of the anterior cover 190, which in combination simulates the outline of human lungs. It is contemplated that the prosthetic lungs 130 may be made of an alternative structure, including hollow forms, solid forms, and semi-solid forms to simulate the human lungs. This prosthetic lung 130 will have the capability of inflating or deflating, thereby simulating a pneumothorax.

Figure 18:
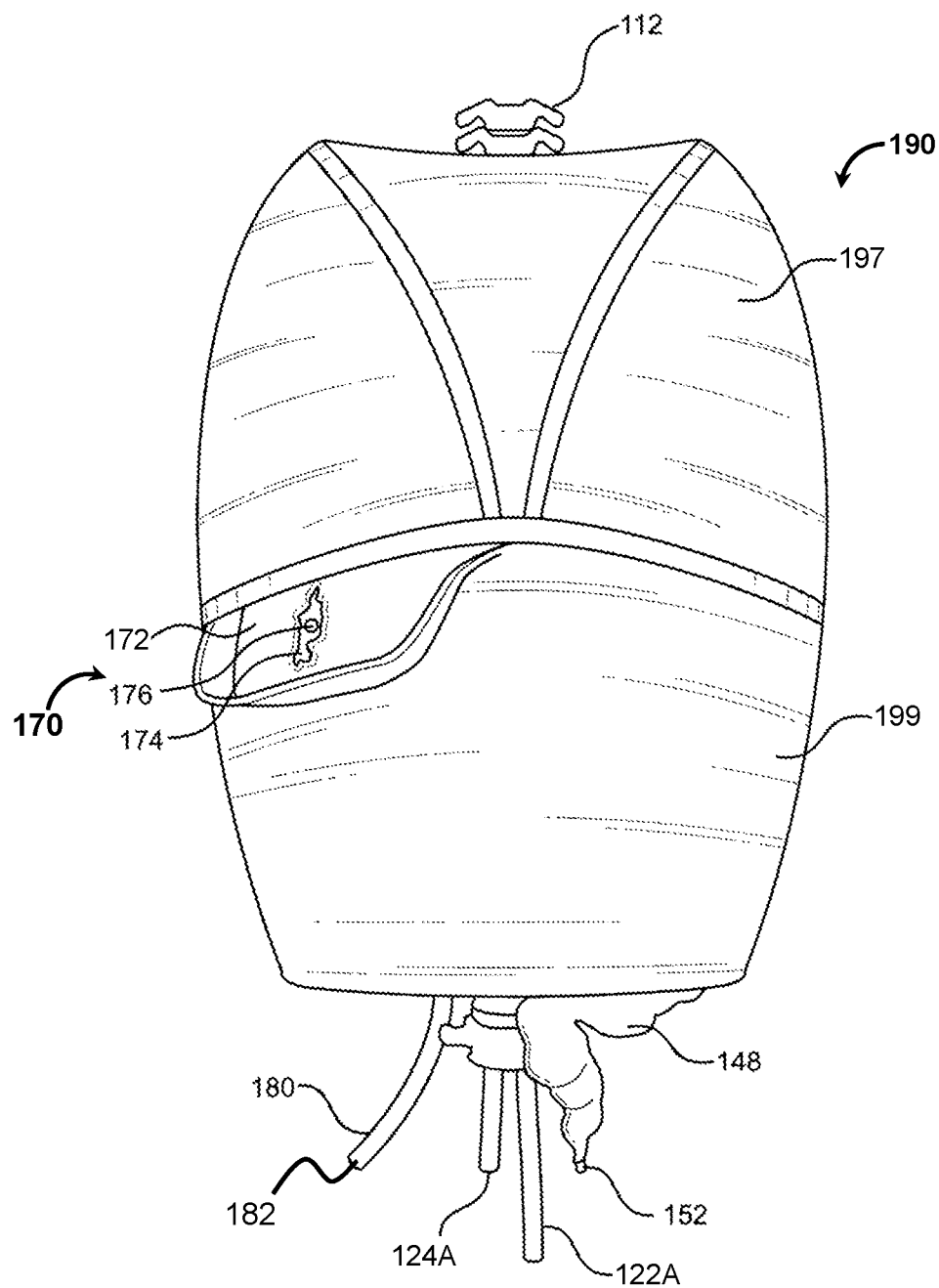
FIG. 18 is a front view of a prosthetic organ module with the anterior cover cut to expose the prosthetic liver with simulated injury, according to one embodiment of the present disclosure.

Referring now to FIG. 18, the prosthetic internal organ module 100 is shown. As above, the prosthetic internal organ module 100 may be used independently, outside the cavity of a simulated human torso, for example, to demonstrate a damaged liver. The prosthetic peritoneum 199 of the anterior cover 190 is shown cut, providing an opening to the body 172 of the prosthetic liver 170, with the simulated injury 174 and orifice 176 (the source of the bleeding).

As above the module frame 110 (particularly the base 118) may be configured to position and support the assembled prosthetic organs. Here, since the prosthetic internal organ module 100 is configured to be used without the cavity of the simulated human torso it may be made from a more durable and rigid material such as plastic. However, it is understood that the module frame 110 may be made of a more flexible material so as to be common to a variety of applications.

Also as above, the anterior cover 190 (particularly here, the prosthetic peritoneum 199 portion) may be configured to provide tactile feedback when cut to provide realistic simulation of the operation. In particular, portions of the anterior cover 190 may be made to resemble a real prosthetic peritoneum in both look and feel. For example, the prosthetic peritoneum 199 of the anterior cover 190 may be made of membrane-like material, that is also semi-translucent, such as semi-clear silicone or other elastomeric material. The membrane-like material may be attached to the module frame 110 by conventional attachment means such as anchors (e.g., where base 118 is made of a rigid plastic plate), adhesives (e.g., where base 118 is flexible elastomeric sheet), etc.

Also as above, the prosthetic gastrointestinal tract 140 may be filled with simulated bodily fluid. Further, a puncture to any portion of the prosthetic gastrointestinal tract 140 may result in the release of the fluid, thus providing visual, textural, and audible cures of the puncture. According to one embodiment, the raiment 11 may be placed over the prosthetic internal organ module 100 to simulate a human upper torso. Further, the raiment 11 may be fitted with anchors corresponding with the anchors 128 on the back of the base 118, thereby allowing the raiment to attach to the prosthetic internal organ module 100.

While the particular Wearable Partial Task Surgical Simulator as herein shown and disclosed in detail is fully capable of obtaining the objects and providing the advantages herein before stated, it is to be understood that it is merely illustrative of the presently preferred embodiments of the disclosure and that no limitations are intended to the details of construction or design herein shown other than as described in the appended claims.

The invention claimed is:

1. A prosthetic internal organ module for a surgery simulator, the prosthetic internal organ module comprising:
   a prosthetic organ platform;
   a plurality of prosthetic internal organs attached to the prosthetic organ platform in an anatomically correct arrangement; and
   an anterior cover made of membrane-like material, said anterior cover positioned over the plurality of prosthetic simulated organs, and attached to the organ platform such that the plurality of prosthetic simulated organs are packaged together between the prosthetic organ platform and the anterior cover; and wherein anterior cover includes a manually pliant silicone sheet configured to substantially enclose the prosthetic simulated organs against the prosthetic organ platform;

wherein the prosthetic organ platform includes a base plate made of a non-consumable material and a plurality of base anchors mounted on the base plate; and wherein the anterior cover is removably attached to the organ platform via the base anchors of the prosthetic organ platform.

2. The prosthetic internal organ module of claim 1, wherein the prosthetic organ platform further includes a conduit attached to the base plate, the conduit having a central lumen configured to route at least portions of a fluid delivery system between the base plate and the anterior cover.

3. The prosthetic internal organ module of claim 1, wherein the prosthetic organ platform includes a first elastomeric sheet.

4. The prosthetic internal organ module of claim 3, wherein anterior cover includes a second elastomeric sheet, said second elastomeric sheet being thinner that the first elastomeric sheet; and wherein the second elastomeric sheet of the anterior cover is attached to the organ platform via an adhesive.

5. The prosthetic internal organ module of claim 1, wherein the anterior cover further includes a prosthetic pleural membrane; and wherein the plurality of prosthetic internal organs includes a prosthetic simulated pair of lungs, said simulated pair of lungs configured to inflate and deflate underneath the prosthetic pleural membrane in simulation of breathing, the simulated pair of lungs further configured to provide support and give shape to the prosthetic pleural membrane.

6. The prosthetic internal organ module of claim 1, wherein the plurality of prosthetic internal organs includes a prosthetic gastrointestinal tract, said prosthetic gastrointestinal tract, including an internal cavity configured to hold a simulated bodily fluid, and a valve in fluid communication with the internal cavity, the valve configured to provide for filling and sealing the simulated bodily fluid within the internal cavity of the prosthetic gastrointestinal tract; and wherein the anterior cover further includes a prosthetic peritoneum configured to cover the prosthetic gastrointestinal tract.

7. The prosthetic internal organ module of claim 6, further comprising a prosthetic omentum attached to the prosthetic gastrointestinal tract.

8. The prosthetic internal organ module of claim 7, wherein the plurality of prosthetic internal organs includes a prosthetic liver configured to simulate a bleeding wound, the prosthetic liver a body formed with a simulated injury, an orifice attached to said simulated injury, and a tube attached to said orifice.

9. A package for open surgery training, the package comprising:

a plurality of prosthetic internal organs;

a fluid delivery system including an exposed inlet, an outlet, and at least one fluid channel between the exposed inlet and the outlet, said fluid delivery system configured to plumb a simulated blood from the exposed inlet to the outlet;

a module frame including a base and a center frame, the base configured to anchor the plurality of prosthetic internal organs in an anatomically correct arrangement, the center frame configured to route the fluid delivery system to a simulated bleeding location; and an anterior cover made of membrane-like material, said anterior cover positioned over the plurality of prosthetic simulated organs, and attached to the module frame such that the plurality of prosthetic simulated organs are packaged together between the module frame and the anterior cover; and wherein the anterior cover includes a manually pliant first elastomer sheet configured to substantially enclose the prosthetic simulated organs against the base of the module frame; and wherein the plurality of prosthetic simulated organs includes a prosthetic simulated liver having a body formed with a simulated bleeding injury, an orifice attached to said simulated bleeding injury, the prosthetic simulated liver attached to the fluid delivery system forming an open fluid path for the simulated blood to bleed out of orifice attached to the simulated bleeding injury upon delivery of the simulated blood via the fluid delivery system.

10. The package for open surgery training of claim 9, wherein the plurality of prosthetic internal organs further includes a prosthetic gastrointestinal tract, said prosthetic gastrointestinal tract, including an internal cavity configured to hold a simulated bodily fluid, and a valve in fluid communication with the internal cavity, the valve configured to provide for filling and sealing the simulated bodily fluid within the internal cavity of the prosthetic gastrointestinal tract; and wherein the anterior cover further includes a prosthetic peritoneum configured to cover the prosthetic simulated liver and to substantially cover the prosthetic gastrointestinal tract.

11. The package for open surgery training of claim 10, further comprising a prosthetic omentum attached to the prosthetic gastrointestinal tract and positioned between the prosthetic gastrointestinal tract and the prosthetic peritoneum.

12. The package for open surgery training of claim 11, wherein the base of the module frame includes a second elastomeric sheet, said second elastomeric sheet being thicker that the first elastomeric sheet; and wherein the first elastomeric sheet of the anterior cover is attached to the second elastomeric sheet of the base via an adhesive bond about a shared periphery of both the first elastomeric sheet and the second elastomeric sheet.

13. The package for open surgery training of claim 12, wherein the anterior cover further includes a prosthetic pleural membrane; and wherein the plurality of prosthetic internal organs includes a prosthetic simulated pair of lungs, said simulated pair of lungs configured to inflate and deflate underneath the prosthetic pleural membrane in simulation of breathing, the simulated pair of lungs further configured to provide support and give shape to the prosthetic pleural membrane.

14. The package for open surgery training of claim 13, wherein the plurality of prosthetic internal organs, the module frame, and the anterior cover are sized and dimensioned to be packaged together in an internal cavity of a torso of a human body.

15. An advanced surgical skills package comprising:

a plurality of prosthetic internal organs;

a fluid delivery system including an exposed inlet, an outlet, and at least one fluid channel between the exposed inlet and the outlet, said fluid delivery system configured to plumb a simulated blood from the exposed inlet to the outlet;

a module frame including a base and a center frame, the base configured to anchor the plurality of prosthetic internal organs in an anatomically correct arrangement, the center frame configured to route the fluid delivery system to a simulated bleeding location;

an anterior cover made of membrane-like material, said anterior cover positioned over the plurality of prosthetic simulated organs, and attached to the module frame such that the plurality of prosthetic simulated organs are packaged together between the module frame and the anterior cover; and a prosthetic omentum; and wherein the anterior cover includes a manually pliant first elastomer sheet configured to substantially enclose the prosthetic simulated organs against the base of the module frame;

wherein the plurality of prosthetic simulated organs includes a prosthetic simulated liver having a body formed with a simulated bleeding injury, an orifice attached to said simulated bleeding injury, the prosthetic simulated liver attached to the fluid delivery system forming an open fluid path for the simulated blood to bleed out of orifice attached to the simulated bleeding injury upon delivery of the simulated blood via the fluid delivery system;

wherein the plurality of prosthetic internal organs further includes a prosthetic gastrointestinal tract, said prosthetic gastrointestinal tract including an internal cavity configured to hold a simulated bodily fluid, and a valve in fluid communication with the internal cavity, the valve configured to provide for filling and sealing the simulated bodily fluid within the internal cavity of the prosthetic gastrointestinal tract;

wherein the anterior cover further includes a prosthetic peritoneum configured to cover the prosthetic simulated liver and to substantially cover the prosthetic gastrointestinal tract;

wherein the prosthetic omentum is attached to the prosthetic gastrointestinal tract and positioned between the prosthetic gastrointestinal tract and the prosthetic peritoneum;

wherein the base of the module frame includes a second elastomeric sheet, said second elastomeric sheet being thicker that the first elastomeric sheet; and wherein the first elastomeric sheet of the anterior cover is attached to the second elastomeric sheet of the base via an adhesive bond about a shared periphery of both the first elastomeric sheet and the second elastomeric sheet.

16. The advanced surgical skills package of claim 15, the anterior cover further includes a prosthetic pleural membrane; and wherein the plurality of prosthetic internal organs includes a prosthetic simulated pair of lungs, said simulated pair of lungs configured to inflate and deflate underneath the prosthetic pleural membrane in simulation of breathing, the simulated pair of lungs further configured to provide support and give shape to the prosthetic pleural membrane.

* * * * *